US006936648B2

(12) United States Patent
Bagwell et al.

(10) Patent No.: US 6,936,648 B2
(45) **Date of Patent: *Aug. 30, 2005**

(54) COATING FOR TREATING SUBSTRATES FOR INK JET PRINTING INCLUDING IMBIBING SOLUTION FOR ENHANCED IMAGE VISUALIZATION AND RETENTION, METHOD FOR TREATING SAID SUBSTRATES, AND ARTICLES PRODUCED THEREFROM

(75) Inventors: Alison Salyer Bagwell, Cumming, GA (US); Kelly Dean Branham, Winneconne, WI (US); Mary Elizabeth Kister, Cumming, GA (US); Leonard Eugene Zelazoski, Kennesaw, GA (US)

(73) Assignee: Kimberly-Clark Worldwide, Inc, Neenah, WI (US)

( * ) Notice: Subject to any disclaimer, the term of this patent is extended or adjusted under 35 U.S.C. 154(b) by 504 days.

This patent is subject to a terminal disclaimer.

(21) Appl. No.: 10/010,466

(22) Filed: Oct. 26, 2001

(65) Prior Publication Data

US 2002/0081421 A1 Jun. 27, 2002

Related U.S. Application Data

(60) Provisional application No. 60/244,262, filed on Oct. 30, 2000.

(51) Int. Cl.$^7$ .................................................. C08K 5/21

(52) U.S. Cl. ....................... 524/215; 524/211; 524/238; 524/239

(58) Field of Search ................................ 524/211, 215, 524/238, 239

(56) References Cited

U.S. PATENT DOCUMENTS

| | | | |
|---|---|---|---|
| 3,338,992 A | | 8/1967 | Kinney |
| 3,341,394 A | | 9/1967 | Kinney |
| 3,418,064 A | * | 12/1968 | Buecheler ...................... 8/654 |
| 3,542,615 A | | 11/1970 | Cary et al. |
| 3,692,618 A | | 9/1972 | Dorschner et al. |
| 3,802,817 A | | 4/1974 | Matsuki et al. |
| 3,849,241 A | | 11/1974 | Butin et al. |
| 3,932,296 A | * | 1/1976 | Byth .......................... 507/240 |
| 4,304,610 A | | 12/1981 | Weisensel |
| 4,340,563 A | | 7/1982 | Appel et al. |
| 4,732,786 A | | 3/1988 | Patterson et al. |
| 5,073,448 A | | 12/1991 | Vieira et al. |
| 5,075,153 A | | 12/1991 | Malhotra |
| 5,100,471 A | | 3/1992 | Winnik et al. |
| 5,165,973 A | | 11/1992 | Kojima et al. |
| 5,244,539 A | * | 9/1993 | McGrath et al. .............. 216/13 |
| 5,268,030 A | | 12/1993 | Floyd et al. |
| 5,273,575 A | | 12/1993 | de Saint Romain |
| 5,279,885 A | | 1/1994 | Ohmori et al. |
| 5,378,574 A | | 1/1995 | Winnik et al. |
| 5,439,739 A | | 8/1995 | Furukawa et al. |
| 5,496,634 A | | 3/1996 | Ogawa et al. |
| 5,501,731 A | | 3/1996 | Schmid et al. |
| 5,679,143 A | | 10/1997 | Looman |
| 5,695,820 A | | 12/1997 | Davis et al. |
| 5,698,183 A | | 12/1997 | Langer et al. |
| 5,751,325 A | | 5/1998 | Leenders et al. |
| 5,755,870 A | | 5/1998 | Ravishankar |
| 5,759,673 A | | 6/1998 | Ikezawa et al. |
| 5,781,216 A | | 7/1998 | Haruta et al. |
| 5,785,743 A | | 7/1998 | Adamic et al. |
| 5,792,249 A | | 8/1998 | Shirota et al. |
| 5,837,041 A | | 11/1998 | Bean et al. |
| 5,853,861 A | | 12/1998 | Held |
| 5,854,307 A | | 12/1998 | Kimura et al. |
| 5,869,442 A | | 2/1999 | Srinivas et al. |
| 5,897,694 A | | 4/1999 | Woolf |
| 5,925,176 A | | 7/1999 | Rehman |
| 5,935,310 A | | 8/1999 | Engel et al. |
| RE36,303 E | | 9/1999 | Ogawa et al. |
| 5,973,036 A | | 10/1999 | Matzinger et al. |
| 6,001,137 A | | 12/1999 | Alfekri et al. |
| 6,001,904 A | | 12/1999 | Matzinger et al. |
| 6,007,610 A | | 12/1999 | Matziner et al. |
| 6,020,405 A | | 2/2000 | Matzinger et al. |
| 6,022,547 A | | 2/2000 | Herb et al. |
| 6,022,908 A | | 2/2000 | Ma et al. |
| 6,025,322 A | | 2/2000 | Boeckh et al. |
| 6,086,903 A | | 7/2000 | Trinh et al. |

FOREIGN PATENT DOCUMENTS

| | | | |
|---|---|---|---|
| DE | 19643281 | A1 | 10/1996 |
| EP | 0458599 | A2 | 5/1991 |
| EP | 0534660 | A1 | 3/1993 |
| EP | 0605730 | A1 | 7/1994 |
| EP | 0627324 | A1 | 12/1994 |
| EP | 0709223 | A | 5/1996 |
| EP | 0709520 | A1 | 5/1996 |
| EP | 0842786 | A1 | 11/1997 |
| GB | 412391 | | 6/1934 |
| WO | 98/43821 | | 10/1998 |
| WO | 99/00541 | | 1/1999 |
| WO | 99/54541 | | 10/1999 |
| WO | 00/56972 | | 9/2000 |
| WO | 01/32974 | A2 | 5/2001 |

OTHER PUBLICATIONS

*Technical Manual of the American Association of Textile Chemists and Colorists*, 1999, p. 18–20, 369–375.

*Wellington Sears Handbook of Industrial Textiles*, by Sabit Adanur, PH.D. copyright 1995, p. 179.

NRL Report No. 4364, "Manufacture of Superfine Organic Fibers," V.A. Wente, E.L. Boone and C.D. Fluharty, Oct. 25, 1954.

(Continued)

*Primary Examiner*—Judy M. Reddick
(74) *Attorney, Agent, or Firm*—Steven Flack; James B. Robinson

(57) ABSTRACT

An aqueous coating formulation containing solids, for enhancing image visualization and retention of acid dye-based inks includes a cationic polymer or copolymer, a fabric softener, urea, and ammonium salts of multifunctional weak acids. Desirably the ammonium salts are selected from the group consisting of ammonium oxalate and ammonium tartrate.

16 Claims, 3 Drawing Sheets

OTHER PUBLICATIONS

NRL Report No. 5265, "An Improved Device for the Formation of Superfine, Thermoplastic Fibers," K.D. Lawrence, R.T. Lucas and J.A. Young, Feb. 11, 1959.
JP 01281982A, Nov. 13, 1989 (Abstract only).
JP 10016381A, Jan. 20, 1998 (Abstract only).
JP 10035090A, Feb. 10, 1998 (Abstract only).
JP 1009279A, Jan. 12, 1989 (Abstract only).
JP 10097762A, Jan. 13, 1989 (Abstract only).
JP 10114144A, May 6, 1998 (Abstract only).
JP 1011876A, Jan. 17, 1989 (Abstract only).
JP 10119425A, May 12, 1998 (Abstract only).
JP 10138632A, May 26, 1998 (Abstract only).
JP 10140059A, May 26, 1998 (Abstract only).
JP 10157278A, Jun. 16, 1998 (Abstract only).
JP 1020188A, Jan. 24, 1989 (Abstract only).
JP 10264506A, Oct. 6, 1998 (Abstract only).
JP 1075281A, Mar. 20, 1989 (Abstract only).
JP 11216948A, Aug. 10, 1999 (Abstract only).
JP 5179577A, Jul. 20, 1993 (Abstract only).
JP 56157470A, Dec. 4, 1981 (Abstract only).
JP 61074889A, Apr. 17, 1986 (Abstract only).
JP 61277481A, Dec. 8, 1986 (Abstract only).
JP 6234268A, Aug. 23, 1994 (Abstract only).
JP 63183873A, Jul. 29, 1988 (Abstract only).
JP 6340163A, Dec. 13, 1994 (Abstract only).
JP 6340164A, Dec. 13, 1994 (Abstract only).
JP 7173420A, Jul. 11, 1995 (Abstract only).
JP 8025794A, Jan. 30, 1996 (Abstract only).
JP 8127979A, May 21, 1996 (Abstract only).
JP 9059550A, Mar. 4, 1997 (Abstract only).
JP 9188978A, Jul. 22, 1997 (Abstract only).
JP 9202038A, Aug. 5, 1997 (Abstract only).
JP 9208853A, Aug. 12, 1997 (Abstract only).
JP 9216917A, Aug. 19, 1997 (Abstract only).
U.S. Appl. No. 09/526,831, filed Mar. 16, 2000.
U.S. Appl. No. 09/702,093, filed Oct. 30, 2000.
U.S. Appl. No. 09/766,262, filed Jan. 19, 2001.

* cited by examiner $R_1$, $R_2$= quatemary ammonium, hydrophilic, hydrophobic, reactive, or self condensing group $R_3$= H, alkyl, or alkoxy group X= halogen or other counter ion a= 1 to 99%, b= (100-a)%, c= 0 to 100-(a+b)%

R1, R2 - as above a= 1 to 99%, b= (100-a)%

$R_1$= for CP 7091 RV, a~90; b~10

COATING FOR TREATING SUBSTRATES FOR INK JET PRINTING INCLUDING IMBIBING SOLUTION FOR ENHANCED IMAGE VISUALIZATION AND RETENTION, METHOD FOR TREATING SAID SUBSTRATES, AND ARTICLES PRODUCED THEREFROM

This application claims priority from U.S. Provisional Application No. 60/244,262 filed on Oct. 30, 2000, and incorporates said Application herein in its entirety.

FIELD OF THE INVENTION

The present invention relates to coatings for treating ink jet printable substrates, which are intended to receive images when printed by ink jet printing devices. In particular, the present invention relates to coatings for treating textile substrates for ink jet printing, methods for treating said substrates, and articles produced therefrom. Such methods facilitate the use of such substrates in commonly available ink jet or laser printing devices, such as wide or narrow format ink jet and laser printers.

BACKGROUND OF THE INVENTION

Ink jet printing is a non-impact and non-contact printing method in which an electronic signal controls and directs droplets or a stream of ink that can be deposited on a wide variety of substrates. Ink jet printing is extremely versatile in terms of the variety of substrates that can be treated, as well as the print quality and the speed of operation that can be achieved. In addition, ink jet printing is digitally controllable. For these reasons, ink jet methodology has been widely adopted for industrial marking and labeling. In addition, ink jet methodology has also found widespread use in architectural and engineering design applications, medical imaging, office printing (of both text and graphics), geographical imaging systems (e.g., for seismic data analysis and mapping), signage, in display graphics (e.g., photographic reproduction, business and courtroom graphics, graphic arts), and the like. Finally, ink jet printing has now also been used to create an image on a variety of textile substrates. The use of ink-jet printing to create an image on textile fabrics has allowed for the rapid visualization of an aesthetic design on fabric without the use of expensive and often wasteful screen printing techniques. Such ink-jet printing methodology allows a designer or production facility to visualize a finished design in significantly less time than is usually necessary to burn a screen image of the design by typical screen printing methodology.

Both dyes and pigments have been used as colorants for such ink jet ink formulations. However, such materials do not always adhere well to substrates to which the ink is applied. For example, dyes may dissolve upon a substrate's contact with water. Thus images applied employing ink jet methodology may tend to run or smear upon repeated contact, or may be actually removed from the printed surface if exposed to substantial quantities of aqueous media (e.g., if an ink jet printed article is laundered). Moreover, images applied employing ink jet methodology may also tend to fade or washout upon prolonged exposure to visible, ultraviolet and/or infrared light. Furthermore, dyes applied to textile substrates may experience severe dye bleed upon application to the substrate. Finally, the color intensity of the image printed on a textile substrate using ink-jet methodology is often lacking in vibrancy.

The nature of textile substrates also poses specific problems when printing or imaging via ink jet print methods, which are not found with common ink jet substrates (e.g. paper or coated paper). For instance, the textile fibers can vary widely in composition, with each composition presenting a unique set of conditions for acceptable printing of the substrate. For example, cotton substrates may be very absorbent, such as in the case of aqueous-based inks. When ink is ejected from the ink channel of an ink jet printing device, it is rapidly absorbed into the fibers of the cotton substrate. Since these fibers are much larger than the fibers typically found in paper substrates, the color density or appearance of color brightness is significantly diminished due to the lack of retention of the colorant at the surface of the fibers. In addition, bleeding, mottle of the print pattern, and loss of image sharpness or clarity can often result from printing on the textile fabric itself.

Conversely, synthetic fibers such as polyester may be poorly wet by the aqueous inks and such inks may be only retained in the interstitial spaces between the fibers. This limited ink retention also causes the print-quality related problems outlined above.

Furthermore, the permanence of the printed image on textile fabrics is often achieved commercially by some post-printing curing process such as heating, steaming, or chemical fixation. These processes tend to be inefficient, requiring further washing and drying steps to remove unfixed colorant from the fabric. It is therefore desirable to enhance the permanence of the printed image on ink jet printable substrates, either in the presence or absence of a post-printing curing process step.

Polymeric materials are typically used commercially to modify the properties of both natural and synthetic textile fibers and substrates. These polymeric treatments may alter textile appearance or hand, reduce shrinking, reduce flammability, or alter other properties of the fiber or substrate. Treatments may even be employed to enhance the ease of printing and/or print performance when commercial printing processes, such as rotary screen printing, are employed. For instance, polyethylene oxide has been used to pretreat a starting cloth material so as to create an adequate textile substrate for ink-jet printing. As disclosed in U.S. Pat. No. 5,781,216 to Haruta et al., the use of polyethylene oxide treated textile substrates are described as being highly capable of providing images of great color depth with sufficient brightness and sharpness, but free of objectionable color bleed. While Haruta discloses such a polyethylene oxide pretreatment with a cationizing agent, to thereby enhance the coloring ability of images, Haruta requires such treatment to thereafter be cured by additional heating, washing and drying steps.

Use of cationic polymers as part of a latex saturant in a hydroentangled fibrous web is disclosed in PCT US 98 11712 to Harris et al., which was published as WO99/00541. As described in WO99/00541, latex saturation is typically followed by a drying step or other curing aids.

Use of imbibing solutions with sodium bicarbonate, sodium carbonate and urea are also known. Such imbibing solutions are typically used by textile mills in ink pastes along with other additives such as thickeners, and not in conjunction with coating treatments on the textile substrates themselves prior to being printed. The ink pastes are then rotary screen printed down onto the fabric substrates. However, an ink jet paste delivery system can not be used for ink jet printing because of the physical constraints of the ink jet printer technology. The salts in the pastes will corrode the ink jet printer heads. Use of ink pastes are also a wasteful process. Furthermore, even with the use of such pastes in a conventional screen printing process, the process experiences a large amount of dye wash off following printing.

Accordingly, there is still a need in the art for ink jet printable substrate coatings and treatment methods which provide for high optical density with a minimum amount of bleeding on the substrate during and after imaging from ink jet printers. There is also a need in the art for such ink jet printable substrate treatment methods which can be applied to textile fabric substrates. In this regard, there is still a need in the art for methods for treating fabrics for receiving ink-jet ink formulations, which methods allow for improved colorfastness and color intensity in a wide variety of textile substrates. Finally, there is still a need in the art for such substrates which are not dependent upon an ink curing step for construction.

SUMMARY OF THE INVENTION

In accordance with the present invention, it has been discovered that the color density and quality of the printed image, and the adhesion properties and/or colorfastness of acid and reactive ink jet ink formulations when applied to a variety of ink jet printable substrates, can be improved by treating the substrates with cationic polymer coating formulations used in conjunction with imbibing solutions, and in particular imbibing solutions containing alkali materials, and urea for reactive-dye based inks, ammonium salts and urea for acid dye-base inks. Such alkali materials may be exemplified by such materials as sodium hydroxide, sodium silicate, sodium trichloracetate, and potassium carbonate. In particular the use of imbibing/coating solutions/formulations containing ammonium salts of multifunctional weak acids and urea has proven effective. Desirably the ammonium salts are selected from the group consisting of ammonium oxalate and ammonium tartrate. Ammonium oxalate and urea for treatment of nylon/LYCRA® type fabrics has proven particularly effective. In an alternate embodiment, tanning agents can be used in conjunction with the ammonium oxalate imbibing solution. Such tanning agents may be exemplified by the group including ethylene glycol monoethyl ether, and thiodiethylene glycol. It has been found that such tanning agents help to improve the durability, in particular, crockfastness with use of such imbibing solutions. A wide array of textile fabric substrates can be treated to improve the colorfastness and washfastness of ink jet ink formulations. The treatment formulations include an aqueous coating formulation containing solids and comprising a cationic polymer or copolymer, a fabric softener, urea and alkali materials, for reactive dye based inks, or in the alternative, the same cationic polymers, and fabric softeners, but additionally urea and ammonium salts for acid dye based inks. In particular the treatment formulations include about 5–95% cationic polymers or copolymers, and about 5–20% fabric softeners. Alternatively, the formulations may also include about 0–80% of a polymeric latex binder so as to increase washfastness. These percentages are based on solids. Total solids content for the formulations typically range from about 10–50%. In an alternate embodiment, use of cationic polymer coatings in conjunction with a separate imbibing solution of either alkali materials and urea for reactive dye classes may be used. In an alternate embodiment, use of cationic polymer coating formulations in conjunction with a separate imbibing solution of ammonium salt and urea for acid dye classes may be used. The present methods provide pathways to the fixation of dyes, irrespective of chemical class or textile fabric substrate, and do so without the need of any further ink curing process beyond drying under ambient conditions. In addition, efficacy of post printing processes such as steaming or curing may be enhanced by such formulations, reducing dye waste and further enhancing color vibrancy. Also, fixation of pigment or colorant may be enhanced by these formulations.

These and other features and advantages of the present invention will become apparent after a review of the following detailed description of the disclosed embodiments and the appended claims.

DETAILED DESCRIPTION OF THE INVENTION

In accordance with the present invention, there are provided aqueous coatings and methods to improve the adhesion properties and/or colorfastness/color density and washfastness of ink jet printable substrates in the absence of a heating or post treatment curing step, said methods including treating a textile substrate with an aqueous coating formulation including cationic polymers or copolymers and fabric softeners. In a desirable method, the method comprises treating a textile substrate with an aqueous coating formulation including about 5–95% cationic polymers or copolymers, and about 5–20% fabric softeners. As has been stated earlier, these percentages are percent of total solids, unless otherwise stated. For the purposes of this application, the percent of the total solids is calculated by dividing the dry parts value for a particular component by the total dry parts of all of the components of the formulation. The present invention is further directed to a treated ink jet printable substrate wherein the treatment comprises an aqueous coating formulation of cationic polymers or copolymers and fabric softeners. A desirable embodiment of the present invention is a treated ink jet printable substrate wherein the aqueous coating treatment comprises about 5–95% cationic polymers or copolymers, and about 5–20% fabric softeners.

Figure 1A:
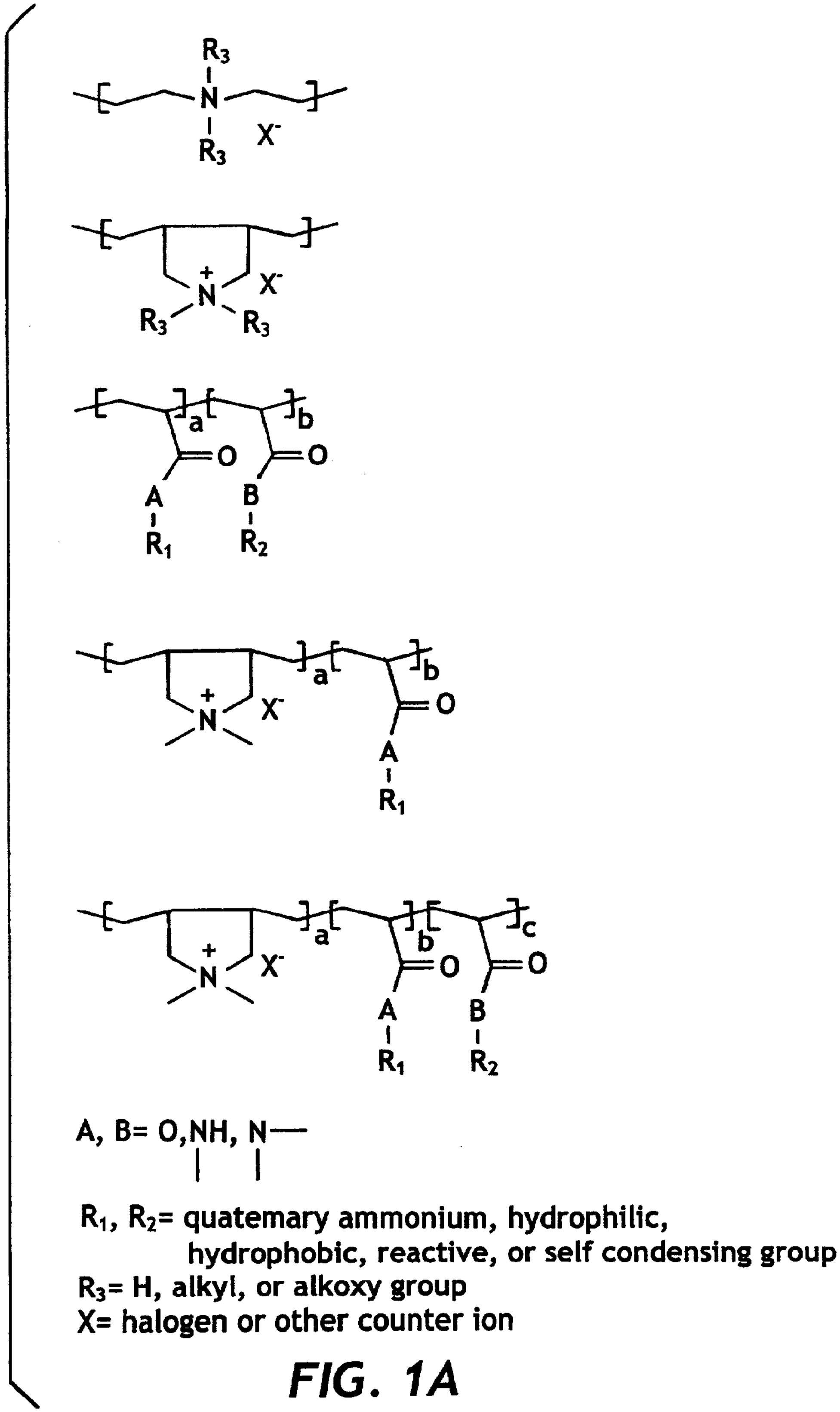
FIGS. 1A–1C illustrates exemplary cationic polymers for use in treatment formulations for substrates in accordance with the present inventive methods.
Figure 1B:
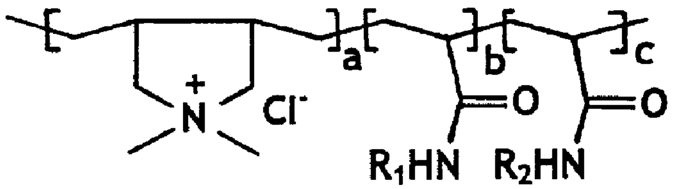
Figure 1C:
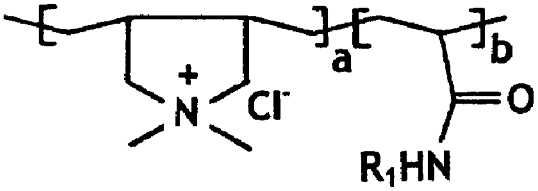
Figure 1C:
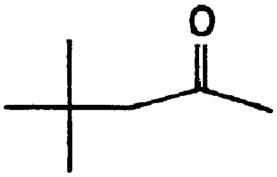

The cationic copolymers function in the formulation to attract and fix oppositely charged anionic dye molecules to the substrates, and in particular, textile fabric substrates. The polymers or copolymers may contain reactive residues or groups capable of crosslinking to the textile fibers, with themselves, or with other components present in the formulation. Such cationic resins may incorporate charge groups in the main polymer chains or polymer backbones, or as side groups in the polymer chains. An exemplary list of the structural formulas of such cationic polymers are illustrated in FIGS. 1A–1C. The cationic polymers for use in the coatings may include but are not limited to, polymers and copolymers of diallyldialkyammonium monomers such as diallyldimethylammonium chloride, cationic acrylate and acrylamide such as acryloxyethyldimethylammonium chloride or acrylamidoethyldimethylammonium chloride monomers, quarternized vinylpyridine such as methyl vinylpyridine chloride, and polyalkylamine polymers and copolymers. Co-monomers in such systems may consist of ones which modify the flexibility, hydrophobicity, or mechanical properties of the polymer molecule. In addition, reactive and/or self-condensing monomers may be included to enhance adhesion to the textile fiber or other components in the formulation. Other examples of cationic polymers with charged groups in the main chain include epihalohydrin-amine polymers such as RETEN® 204 LS and KYMENE® 557 LX polymers of Hercules Incorporated, of Wilmington, Del. A specific example of a preferred cationic polymer resin is CP 7091 RV available from ECC International of Roswell, Ga., with CP 7091 RV being a poly (diallyldimethlammonium chloride-co-diacetone acrylamide).

Suitable fabric softeners which may be used in accordance with the present inventive coatings/methods include, but are not limited to, VARISOFT® 222 of the Goldschmidt Chemical Corporation of Greenwich, Conn., ADOGEN® 432 also of Goldschmidt, ACCOSOFT® 550-75 of the Stepan Company of Northfield, Ill. ALUBRASOFT® Super 100 and ALUBRASOFT® 116 of the BASF Corporation, Specialty Chemicals Division of Mt. Olive, N.J., and AHCOVEL® Base N-62 of ICI Surfactants or Hodgson Texiles Chemical of Mt. Holly, N.C. Suitable fabric softeners include those that are cationic or nonionic and provide the attributes of print quality and image brightness to the printed textile substrate. The fabric softener most suitable to a particular textile fabric substrate varies by fabric substrate. For instance, it has been found that the fabric softener VARISOFT® 222 performs better with cotton/banner fabric samples while ADOGEN® 432 performs better with nylon/LYCRA® samples.

In another embodiment of the present invention, the previously described coating treatments or formulations for ink jet printable substrates also include a latex binder in order to further enhance the adhesion and/or waterfastness of colorants on the textile fabric substrates. It has been found that coated ink jet receptive substrates including a latex binder provide high color density and saturation, superior print quality, reduction of wicking or bleeding, and enhanced ink absorption. Furthermore, the coating or treatment formulations provide a waterfast printed image when printing via an ink jet printing process, without the necessity of post-printing curing steps such as heating, steaming, chemical fixation, or radiation. Likewise, the present invention is also directed to a treated ink jet printable substrate wherein the treatment comprises an aqueous coating formulation of cationic polymers or copolymers, fabric softeners, and a latex binder. A desirable embodiment of the present invention is a treated ink jet printable substrate wherein the aqueous treatment formulation comprises about 5–95% cationic polymers or copolymers, about 5–20% fabric softeners and about 0–80% latex binder.

The treatment or coating formulations in this alternate embodiment consist primarily of cationic polymers and copolymers, fabric softeners and a water-insoluble polymer in the form of a latex dispersion or emulsion. In particular, the treating formulation may include about 0–80% polymeric latex binder depending on the textile fabric substrate. The latex reinforcing polymers may be either nonionic or cationic. By way of example only, the latex materials may include vinylacetate, ethylene-vinylacetate, acrylate, styrene, and styrene-acrylate resins and other cationic or nonionic latexes. These resins may include reactive or self cross-linking groups in addition to inherent cationic functionality.

The aqueous coating formulations may also include other additives which effect the appearance or tactile properties of the finished substrate, such as optical brighteners. It should be recognized that all of the stated percentages are based on solids unless otherwise noted. Total solids content for the formulations typically range from about 5–50%, but desirably range from about 5–32%. More desirably the total solids content for the formulations range from about 25–28%.

Figure 2:
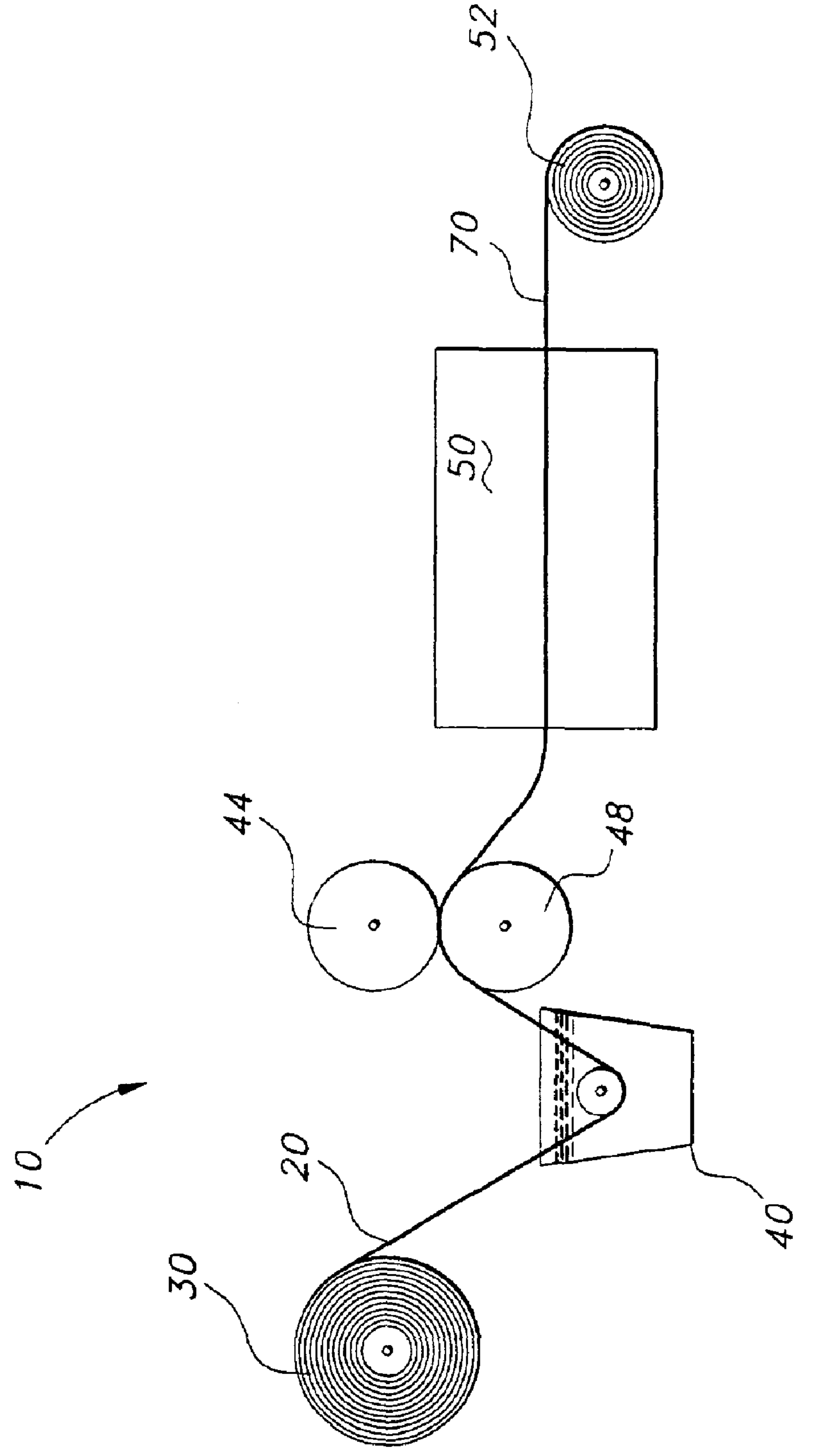
FIG. 2 illustrates a schematic view of a dip and squeeze process for treating ink jet printable substrates.

Treatment formulations (compositions) for the textile substrates are made by adding the above components from stock solutions or dispersions, or as solids where appropriate, and mixing to homogeneity. Application of the treatment formulation to the textile substrates may be carried out by any known means to those having ordinary skill in the art. For instance, fabric substrates may be treated by a standard padding (dip and squeeze) method and dried in a forced air oven, although any suitable drying means of textiles known to those skilled in the art may be employed. As can be seen in FIG. 2 showing a schematic view of a dip and squeeze process 10 for treating ink jet printable substrates, a textile substrate 20 is unwound from the incoming roll 30 and is then dipped in a saturator tank/bath 40 for sufficient time for it to become saturated with the treating formulation. The textile substrate is then run through a pressurized nip roll set 44 and 48. The pressure on the rolls should be in the range of about 10–120 psig but desirably in the range of about 10–65 psig, depending on the type of textile fabric substrate utilized, and the total solids content of the treatment formulations used. The pressurized nip rolls squeeze the coating evenly onto the substrate so as to penetrate the surface of the substrate. The rolls may be either rubber or steel, however a set of rolls in which at least one roll being rubber is desirable. Following passage through the nip pressure rolls, the textile substrate is coursed through a drying means 50. The drying means may include a tenter frame for holding the textile substrate, and may itself encompass multiple consecutive drying means depending on the nature of the substrate to be dried. The drying temperature is desirably in the range from about 200° F. to 325° F., desirably between about 220 to 250° F. The typical time for drying is between about 30 seconds and 3 minutes. Following drying, the finished treated textile substrate is taken up on a wind up roll 52. The textile substrate may be rolled up for storage or moved to a second lamination process in preparation for ink jet printing. The textile substrate may be laminated to a carrier backing for ease of printing.

Using this application method, dry pick-up ratios of the textile substrate may vary from about 0.5% to about 50%. Desirably, the dry pick-up ratios may vary from about 3 to about 20%. More desirably, the dry pick-up ratios may vary from about 6 to about 15%. Wet pick-up ratios for the textile substrates are typically between about 30–150%. Desirably such wet pick-up ratios are between about 80–120%. Desirably for DACRON® banners, the wet pick up ratios are between about 40–120%. These terms are defined by equations which follow.

Substrates which may be treated in accordance with the present inventive methods are varied and include paper, fabric, films, and the like, although textile fabric substrates are preferred. Such fabrics may include cotton, silk, wool, polyester, rayon, nylon, and blends thereof. Furthermore, the disclosed ink jet substrates may provide the benefits disclosed herein with or without further post-printing curing steps involving the use of heat, radiation or pressure. Ideally such treated substrates provide adhesion and/or colorfastness of the colorant with only ambient or room temperature curing or drying of the printed image. It should be noted however, that while not being necessary for the process, a post printing curing step may further enhance the colorfastness and washfastness of the printed image on the substrate. The basis weight of the various fabrics which may be treated by these formulations may range from about 2 ounces per square yard (osy) to about 9 osy.

Dye classes which may be used in ink jet printers to be printed on such substrates include acid dyes, reactive dyes, direct dyes, azoic dyes, sulfur dyes, modified dyes, polymeric dyes, copolymerized dyes or other classes of colorants known to those skilled in the art. Furthermore, pigment colorants may be used in the ink jet printers to be printed on such substrates. Additionally, it has been found that when such substrate is printed with ink jet inks containing additives, such as those described in U.S. Application bearing Ser. No. 09/109,681 filed Jul. 2, 1998 and U.S. Pat. No. 5,897,694 incorporated herein by reference in its entirety, such substrate treatments may be enhanced so as to provide enhanced colorfastness and washfastness.

In a further embodiment of the present invention, such previously described treatment formulations may be used in a method to treat banner textile fabric substrates. Such substrate materials include 100% cotton, 100% polyester, 100% silk, nylon, rayon and blended materials, such as blends of cotton and polyester, as well as nonwoven materials. For instance, it has been found that the pretreatment of banner textile fabric substrate with an aqueous coating formulation including cationic polymers, fabric softeners, and latex polymer binders in accordance with the previously described methods enable the banner substrates to be ink jet printable, with improved colorfastness/color density and washfastness, and with reduced color bleed. Likewise, the present invention is also directed to a treated ink jet printable banner substrate wherein the treatment comprises a formulation of cationic polymers or copolymers, fabric softeners, and an optional latex binder. A desirable embodiment of the present invention is a treated ink jet printable banner substrate wherein the aqueous treatment formulation includes between about 5–95% cationic polymers or copolymers, between about 5–20% fabric softeners and between about 0–80% latex binder.

In accordance with yet another embodiment of the present invention, there are provided articles produced by the above described methods, employing treated textile substrates as described herein. Such articles may include for example banners, wall coverings and other home furnishing products. Thus according to the present invention, ink jet printed images applied to a treated substrate as described herein, resists removal of said image from said substrate, even upon repeated contact of the printed substrate with water. Such repetitive contact can be the result of normal handling of an article, accidental exposure to liquid, and routine laundering of the article. When articles according to the present invention comprise a treated substrate containing an ink jet image printed thereon, the resulting image adheres sufficiently to said substrate to resist removal therefrom upon washing of said article. The present invention including each of the various embodiments is further described by the examples which follow. Such examples however, are not to be construed as limiting in any way either the spirit or the scope of the present invention.

Preliminary Examples

Textile substrate samples were first printed with a test pattern using a commercial ink jet printer utilizing commercial ink jet inks containing acid, reactive, and/or direct dyes. Color density, color bleed, and print quality were evaluated on the samples as printed. These textiles included cotton poplin textile substrates. Duplicates of both sets of samples were washed using a washing method as described. Color density, color bleed, print quality or appearance, and color permanence were evaluated using the washed samples. Data from the preliminary examples is expressed in Table 1 which follows.

TABLE 1

| INK | INK ADDI-TIVE | FABRIC TREATMENT | HEAT TREATMENT | COLORFAST EVAL. WATER DELTA E | DETERG. DELTA E |
|---|---|---|---|---|---|
| ENCAD ® GA | none | none | none | <56 | <82 |
| ENCAD ® GA | none | 0.5% CP 7091 RV | none | <29 | <66 |
| ENCAD ® GA | none | 1.0% CP 7091 RV | none | <28 | <50 |
| ENCAD ® GA | none | 2.0% CP 7091 RV | none | <27 | <32 |

CP 7091 RV=is a diallyldimethyammonium chloride/diacetone acrylamide copolymer, ECC International. ENCAD® GA inks employ standard monomeric dyes. Samples were hand washed. The sampling tested magenta inks. Delta E was calculated in the samples utilizing the spectrodensitometer and equation described below. The sampling was produced using a dip and squeeze method, as previously described. As can be seen, the coating in the Preliminary Examples only included cationic polymer in the aqueous formulation. Percent represents percent solution.

A second more rigorous set of tests and examples were run on a variety of fabric substrates. These textile fabric substrates include the materials listed in Table 2.

TABLE 2

| FABRIC | STYLE | Con-struction | SOURCE | BASIS WEIGHT ($OZ/YD^2$) | BASIS WEIGHT SI UNITS ($G/M^2$) |
|---|---|---|---|---|---|
| Polyester poplin | PP 6248 | Plain Weave | Fisher Textiles | 3.8 | 128.8 |
| Polyester satin | PS241 | Satin | Fisher Textiles | 4.1 | 139.0 |
| 250 Denier DAC-RON ® Poly. | 250 DAC-RON ® | Plain Weave | Fisher Textiles | 3.2 | 108.5 |
| Cotton Poplin | 9680 | Plain Weave | Lorber Indust. | 6.5 | 220.39 |
| Cotton Jersey | 5118 | Knit | Lorber Indust. | 8.2 | 277.9 |
| Cotton Sheeting | | Plain Weave | Cranston Mills | 7.0 | 237.2 |
| .16 mm Silk Charmeuse | 12104 | Satin | U.S. Silk, Inc. | 2.0 | 67.8 |
| Silk crepe dechine .18 mm | 14654 | Crepe | U.S. Silk, Inc. | 2.3 | 78.0 |
| Polyester | NOFU7- | Crepe | Scher | 3.8 | 128.8 |

TABLE 2-continued

| FABRIC | STYLE | Con-struction | SOURCE | BASIS WEIGHT (OZ/YD$^2$) | BASIS WEIGHT SI UNITS (G/M$^2$) |
|---|---|---|---|---|---|
| Georgette | 6058A | Georgette | Fabrics, Inc. | | |
| Polyester stretch crepe | | Knit | Scher Fabrics, Inc. | 3.2 | 108.5 |
| Poly/ LYCRA ® Blend | 55153 | Knit | Guilford Mills | 5.5 | 186.4 |
| nylon/ LYCRA ® blend | 56062 | Knit | Guilford Mills | 4.0 | 135.6 |
| Rayon | YWSR 1352 | Crepe | U.S. Silk, Inc. | 3.5 | 118.6 |

U.S. Silk, Inc. is located in New York, N.Y. Guilford Mills is located in New York, N.Y. Scher Fabrics, Inc. is located in New York, N.Y. Cranston Mills is located in Cranston, R.I. Lorber Industries is located in Gardena, Calif. Fisher Textiles is located in Indian Trail, N.C.

Conditions for Second Set of Examples

Printing Steps

In each of the following examples, treated textile samples were printed using an ENCAD® Pro E (@ 300 dpi) ink jet printer obtained from ENCAD® Inc. of San Diego, Calif. ENCAD® GA, GS, or GO inks were employed using 4-Pass Enhanced Print Mode, that is with the printer passing over the textile substrate four times. In some instances, as noted as double strike in data tables, the printing head was preheated and option identified as number "7" was selected on the printer. This option enabled more ink to be expelled from the printer onto the substrates. Dyes in the inks consisted of reactive, acid, and/or direct dyes and are described in Table 3.

TABLE 3

Inks Used

| Color | Order # | Dyes |
|---|---|---|
| **GS Ink** | | |
| Cyan | 209489 | Direct |
| Magenta | 208163-2 | Acid/Reactive |
| Yellow | 208163-3 | Acid |
| Black | 208163-4 | Direct |
| **GO Ink** | | |
| Color | Order # | |
| Cyan | 208165-1 | Pigment |
| Magenta | 208165-2 | Pigment |
| Yellow | 208165-3 | Pigment |
| Black | 208165-4 | Pigment |
| **GA Ink** | | |
| Color | Order # | Dyes |
| Cyan | 209491 | Direct |
| Magenta | 209490 | Acid |
| Yellow | 208164-3 | Acid |
| Black | 208164-4 | Direct |

Sample sizes were typically 11 by 15 inches. Additionally, a floral three color print, using lavender, green and magenta was used for testing, of approximately 14 by 25 inches in size. Where it was difficult to distinguish between shades of green, a neutral portion (that is free of ink) of the sample was also evaluated.

Color Measurements

L* a* b* color values measurements (CIE 1976 Commission Internationale de ÍEclairage) and optical density were made of the printed textile substrates using an X-RITE® 938 Spectrodensitometer (D65/10°) using CMY filters, in accordance with the operator's manual. The X-RITE®(D spectrodensitometer was obtained from the X-RITE® Corporation of Grandville, Mich. Average optical densities were taken as the sum of the average of three measurements using each filter. Delta E is calculated in accordance with the following equation:

$$\Delta E=SQRT\ [(L^*standard-L^*\ sample)^2+(a^*\ standard-a^*\ sample)^2+(b^*standard-b^*\ sample)^2]$$

The higher the delta E, the greater the change in color intensity. Unless the color's intensity is increased by a curing step, a large increase in delta E would typically be indicative of fading. The testing was in accordance with ASTM DM 224-93 and ASTM E308-90. Where values for delta E are less than 3.0, it is generally accepted that such color change cannot be observed with the human eye. A detailed description of spectrodensitometer testing is available in the *Technical Manual of the American Association of Textile Chemists and Colorists*, Volume 73, 1999, by AATCC (American Association of Textile Chemists & Colorists).

Washing Method for Textile Samples

When indicated, textile samples were washed using the following method. Samples were placed in an appropriate size beaker or container such as a one liter beaker. Samples were then placed under cold running water (between approximately 10–20° C.) for approximately two minutes. The cold water was then drained from the textile samples. The beakers were then refilled with hot water (between approximately 40–50° C.), and one ounce of detergent (SYNTHRAPOL® per gallon of water was added to the beakers).

The textile samples were then washed out for approximately five minutes and then rinsed and drained of remaining water. Finally, the textile samples were rinsed with warm water (of between approximately 25–30° C.) for two minutes followed by a rinse with cold water (of between approximately 10–20° C.) for approximately one more minute.

Typically, although not necessarily required for curing, a second set of samples were printed and subsequently steamed using a laboratory steamer for comparison. For the purposes of the examples, if a colorfastness level is characterized as poor, bleeding or wicking has occurred. If a washfastness level has been characterized as poor, the image has washed out. If a colorfastness and washfastness level has been characterized as good, the color vibrancy and image retention is noticeably better than the poor level. If the colorfastness and washfastness levels are characterized as excellent, the color properties and vibrancy are the highest levels with the highest color density.

EXAMPLES

It should be noted that for each of the following examples, the textile substrate had been laminated to an adhesive coated paper backing which was obtained from American Builtrite, Inc. under the designation PROTECRITE® 6798 prior to printing to enable the substrate to be easily coursed through the printer. The substrates were then removed from the backing prior to washing. Adhesive coated backing papers identified by the designation 6798 include a paper having a nominal thickness of 5.4 mil., an initial adhesion value of 27 oz/in, a tensile strength of 16 lbs/in the machine direction, and an elongation capability of 10% in the machine direction. The batch formulations utilized are described in the following example summaries.

Example 1

Cationic copolymer CP 7091 RV (ECC International), poly(diallyldimethylammonium chloride-co-diacetone acrylamide), was obtained in a 49.3% stock solution in water. 20.3 wet parts of this solution (10 dry parts, or approximately 90–91% of the total dry parts) were added to 70.3 parts water with mixing. 1.1 wet part (1 dry part, or approximately 9% of the total dry parts) VARISOFT® 222 fabric softener (90% in water) was added and the entire solution was mixed until homogeneous. This formulation was used to treat 100% cotton poplin via a padding application and dried as previously described. A portion of this sample was laminated to an adhesive paper carrier, printed with an ink jet printer and dried under ambient conditions. The properties of the sample were evaluated for quality of the printed image, ink retention, and color density or saturation under the following conditions: 1) immediately after printing, 2) after printing and washing, 3) after printing and steaming, 4) after printing, steaming and washing. The printed samples exhibited superior image quality with little or no bleed, excellent ink retention, and excellent color density. Samples that were steamed exhibited excellent enhancement of color and appearance. Washfastness of steamed samples and samples not post-treated with steam exhibited moderate retention of color when washed. This Example utilized the GS ink set.

Example 2

The formulation employed in Example 1 was used to treat a 100% polyester georgette fabric. Results for this fabric were similar to those obtained in Example 1. This Example utilized the GS ink set and GO ink set.

Example 3

20.3 wet parts (cationic copolymer CP 7091 RV (ECC International) (49.3% in water)(10 dry parts or approximately 90–91% of the total dry parts) was added to 48.9 parts water with mixing. 22.5 wet parts ADOGEN® 432 fabric softener (4.4% in water)(1 dry part, or approximately 9% of the total dry parts) was added and the entire solution was mixed until homogeneous. This formulation was used to treat 100% cotton poplin via a conventional padding application and dried. The sample was printed and evaluated using the process described in Example 1. The printed sample exhibited superior image quality with little or no bleed, excellent ink retention, and excellent color density. Samples that were steamed exhibited excellent enhancement for color and appearance. Washfastness of steamed samples and samples not post-treated with steam exhibited moderate retention of color when washed. This Example utilized the GS ink set.

Example 4

The formulation employed in Example 3 was used to treat a 100% silk charmeuse fabric. Results for this fabric were similar to those obtained in Example 3. This Example utilized the GS ink set.

Example 5

The formulation employed in Example 3 was used to treat a 100% silk crepe de chine fabric. Results for this fabric were similar to those obtained in Example 3. This Example utilized the GS ink set.

Example 6

20.3 wet parts cationic copolymer CP 7091 RV (ECC International) (49.3% in water) was added to 48.9 parts water with mixing. 11.3 wet parts ADOGEN® 432 fabric softener (4.4% in water) and 11.3 wet part VARISOFT® 222 (4.7% in water) was added and the entire solution was mixed until homogeneous. This formulation was used to treat 100% cotton poplin via a conventional padding application and dried. The sample was printed and evaluated using the process described in Example 1. The printed sample exhibited superior image quality with little or no bleed, excellent ink retention, and excellent color density. Samples that were steamed exhibited excellent enhancement for color and appearance. Washfastness of steamed samples and samples not post-treated with steam exhibited moderate retention of color when washed. This Example utilized the GS ink set.

Example 7

A treatment composition was formulated as in Example 6, substituting 23.1 wet parts ACCOSOFT® 550 fabric softener (4.3% in water) (1 dry part, or approximately 9% of the total dry parts) for parts ADOGEN® 432 fabric softener. The cationic polymer made up 10 dry parts or approximately 90–91% of the total dry parts. The wet parts of water constituted approximately 48.2 parts. This formulation was used to treat 100% cotton poplin via a padding application and dried. The sample was printed and evaluated using the process described in Example 1. The printed sample exhibited superior image quality with little or no bleed, excellent ink retention, and excellent color density. Samples that were steamed exhibited excellent enhancement for color and appearance. Permanence of color to washing of steamed was dramatically increased compared to untreated samples. Some enhancement of colorfastness was achieved without steaming. This Example utilized the GS ink set.

Example 8

The formulation employed in Example 7 was used to treat 85/15 nylon/LYCRA® blend fabric. Results for this fabric were similar to those obtained in Example 7. This Example utilized the GS ink set.

Example 9

The formulation employed in Example 7 was used to treat a 100% silk charmeuse fabric. Results for this fabric were similar to those obtained in Example 7. This Example utilized the GS ink set.

Example 10

A treatment composition was formulated as in Example 3, substituting 22.7 wet parts ALUBRASOFT® Super 100 fabric softener (4.4% in water)(1 dry part or approximately 9% of the total dry parts) for parts ADOGEN® 432 fabric softener. The formulation included 20.3 wet parts of 7091 RV (10 dry parts, or approximately 90–91% of the total dry parts), and 48.7 parts water. This formulation was used to treat cotton poplin via a conventional padding application and dried. The sample was printed and evaluated using the process described in Example 1. The printed sample exhibited superior image quality with little or no bleed, excellent ink retention, and excellent color density. Samples that were steamed exhibited excellent enhancement for color and appearance. Permanence of color to washing of steamed samples was dramatically increased compared to untreated samples. Some enhancement of colorfastness was achieved without steaming. The Example utilized the GS ink set.

Example 11

The formulation employed in Example 10 was used to treat 85/15 nylon/LYCRA® blend fabric. Results for this fabric were similar to those obtained in Example 10. The Example utilized the GS ink set.

Example 12

The formulation employed in Example 10 was used to treat a 100% silk charmeuse fabric. Results for this fabric were similar to those obtained in Example 10. The Example utilized the GS ink set.

Example 13

A treatment composition was formulated as in Example 3, substituting 8.8 wet parts AHCOVEL® fabric softener (11.3% in water)(1 dry part, or approximately 9% of the total dry parts) for parts ADOGEN® 432 fabric softener. The formulation included 20.3 wet parts of 7091 RV (10 dry parts, or approximately 90–91% of the total dry parts), and 62.5 parts water. This formulation was used to treat 100% cotton poplin via a padding application and dried. The sample was printed and evaluated using the process described in Example 1. The printed sample exhibited superior image quality with little or no bleed, excellent ink retention, and excellent color density. Samples that were steamed exhibited excellent enhancement for color and appearance. Permanence of color to washing of steamed samples was dramatically increased compared to untreated samples. Good enhancement of colorfastness was achieved without steaming. The Example utilized the GS ink set.

Example 14

Cationic polymer CP 261 LV (ECC International), Poly (diallyldimethylammonium), was obtained in a 43.0% stock solution in water. 23.3 wet parts of this solution (10 dry parts, or approximately 90–91% of the total dry parts) was added to 47.1 parts water with mixing. 21.3 wet parts VARISOFT® 222 fabric softener (4.7% in water)(1 dry part, or approximately 9% of the total dry parts) was added and the entire solution was mixed until homogeneous. This formulation was used to treat 100% cotton poplin via a padding application and dried. The sample was printed and evaluated using the process described in Example 1. The printed sample exhibited superior image quality with little or no bleed, excellent ink retention, and excellent color density. Samples that were not steamed exhibited moderate retention of color when washed. Some enhancement of colorfastness was achieved. Samples that were steamed exhibited excellent enhancement for color and appearance. Washfastness of steamed samples and samples not post-treated with steam exhibited moderate retention of color when washed. The Example utilized the GS ink set.

Example 15

28.8 wet parts of a solution containing 80% ethoxylated polyethylenimine (34.7% in water)(10 dry parts, or approximately 90–91% of the total dry parts) was combined with 41.6 parts water with mixing. 21.3 wet parts VARISOFT® 222 fabric softener (4.7% in water) (1 dry part, or approximately 9% of the total dry parts) were added and the entire solution was mixed until homogeneous. This formulation was used to treat 100% cotton poplin via a padding application and dried. The sample was printed and evaluated using the process described in Example 1. The printed sample exhibited superior image quality with little or no bleed, excellent ink retention, and excellent color density. Samples that were not steamed exhibited moderate retention of color when washed. Some enhancement of colorfastness was achieved. Samples that were steamed exhibited excellent enhancement for color and appearance. Washfastness of steamed samples and samples not post-treated with steam exhibited moderate retention of color when washed. The Example utilized the GS ink set.

Example 16

50.7 wet parts cationic copolymer CP 7091 RV (ECC International) (49.3% in water)(25 dry parts, or approximately 18–19% of the total dry parts) was added to 656 parts water with mixing. 90.6 wet parts AIRFLEX® 540 latex emulsion (ethylene-vinyl acetate copolymer, 55.2% in water)(50 dry parts, or approximately 37% of the total dry parts) of AirProducts and Chemicals Inc. of Allentown, Pa., 114.9 wet parts PRINTRITE® 595 acrylic emulsion (Noveon Performance Coatings, 43.5% in water)(50 dry parts, or approximately 37% of the total dry parts), and 212.8 wet parts VARISOFT® 222 fabric softener (4.7% in water)(10 dry parts, or approximately 7% of the total dry parts) were added and the entire solution was mixed until homogeneous. This formulation was used to treat 100% cotton poplin via a padding application and dried. The sample was printed and evaluated using the process described in Example 1. The printed sample exhibited superior image quality with little or no bleed, excellent ink retention, and excellent color density. Samples that were not steamed exhibited good retention of color when washed. Samples that were steamed exhibited excellent enhancement for color and appearance. Permanence of color to washing was dramatically increased compared to untreated samples. The Example utilized the GS ink set.

Example 17

The formulation employed in Example 16 was used to treat a 100% cotton Jersey knit fabric. Results for this fabric were similar to those obtained in Example 16. The trial utilized the GS ink set.

Example 18

The formulation employed in Example 16 was used to treat an 85/15 nylon/LYCRA® blend fabric. Results for this fabric were similar to those obtained In Example 16. The Example utilized the GS ink set.

Example 19

The formulation employed in Example 16 was used to treat a 100% silk charmeuse fabric. Results for this fabric were similar to those obtained in Example 16. The Example utilized the GS ink set.

Example 20

The formulation employed in Example 16 was used to treat a 100% silk crepe de chine fabric. Results for this fabric were similar to those obtained in Example 16. The Example utilized the GS ink set.

Example 21

50.7 wet parts cationic copolymer CP 7091 RV (ECC International) (49.3% in water)(25 dry parts, or approximately 18–19% of the total dry parts) was added to 656.0 parts water with mixing. 90.6 wet parts AIRFLEX® 540 latex emulsion ethylene-vinyl acetate copolymer, 55.2% in water)(50 dry parts, or approximately 37% of the total dry parts), 114.9 wet parts PRINTRITE® 591 acrylic emulsion (Noveon Performance Coatings, 43.5% in water)(50 dry parts, or approximately 37% of the total dry parts), and 212.8 wet parts VARISOFT® 222 fabric softener (4.7% in water) (10 dry parts, or approximately 7% of the total dry parts) were added and the entire solution was mixed until homogeneous. This formulation was used to treat 100% cotton poplin via a padding application and dried. The sample was printed and evaluated using the process described in Example 1. The printed sample exhibited superior image quality with little or no bleed, excellent ink retention, and excellent color density. Samples that were not steamed exhibited good retention of color when washed. Samples that were steamed exhibited excellent enhancement for color and appearance. Permanence of color to washing was dramatically increased compared to untreated samples. Little measurable washout was detected. The Example utilized the GS ink set.

Example 22

The formulation employed in Example 21 was used to treat a 100% cotton Jersey knit fabric. Results for this fabric were similar to those obtained in Example 21. The Example utilized the GS ink set.

A sample result for Delta E values is reflected in the following Table 4. It should be recognized that values for delta E can range from 0 to 100 with the lower values being preferred for demonstrating minimum loss of color vibrancy/fading. Delta E values are a comparison of "treated and washed" or "treated and dry cleaned" samples versus "treated" samples. In some instances, Delta E values are a comparison of "treated, steamed, and washed" samples, versus "treated" samples. Textile fabrics which were capable of being printed without a coating experienced poor printing attributes and experienced total washout (with a Delta E theoretically at approximately 100). The following data applies to a Cranston cotton sample, which was treated with a coating formulation as described in Example 21.

TABLE 4

| | L* | A* | B* | DELTA E |
|---|---|---|---|---|
| TREATED | | | | |
| Magenta | 58.0 | 30.8 | −17.6 | standard |
| Treated & Washed | | | | |
| Magenta | 59.0 | 37.2 | −22.9 | 8.3 |

Example 23

The formulation employed in Example 21 was used to treat a 100% silk charmeuse fabric. Results for this fabric were similar to those obtained in Example 21. This substrate was cleaned using commercial dry cleaning facilities and sample results are reflected in the following Table 5. The Example utilized the GS ink set.

TABLE 5

| | L* | A* | B* | DELTA E |
|---|---|---|---|---|
| TREATED | | | | |
| Magenta | 46.9 | 54.8 | −5.2 | standard |
| Black 1 | 29.5 | 1.8 | 0.5 | standard |
| Yellow | 83.6 | 5.0 | 91.8 | standard |
| Cyan | 61.8 | −27.9 | −31.2 | standard |
| Dry Cleaned | | | | |
| Magenta | 44.7 | 54.6 | −5.0 | 2.3 |
| Black 1 | 27.7 | 1.4 | −.03 | 2.0 |
| Yellow | 82.4 | 4.7 | 90.3 | 1.9 |
| Cyan | 60.8 | −28.5 | 29.8 | 1.8 |

Example 24

10.1 wet parts cationic copolymer CP 7091 RV (ECC International) (49.3% in water)(5 dry parts, or approximately 45% of the total dry parts) was added to 48.8 parts water with mixing. 11.5 wet parts PRINTRITE® 591 acrylic emulsion (Noveon Performance Coatings, 43.5% in water)(5 dry parts, or approximately 45% of the total dry parts), and 21.3 wet parts VARISOFT® 222 fabric softener (4.7% in water) (1 dry part, or approximately 9% of the total dry parts) were added and the entire solution was mixed until homogeneous. This formulation was used to treat 100% cotton poplin via a padding application and dried. The sample was printed and evaluated using the process described in Example 1. The printed sample exhibited superior image quality with little or no bleed, excellent ink retention, and excellent color density. Samples that were not steamed exhibited good retention of color when washed. Samples that were steamed exhibited excellent enhancement for color and appearance. Washfastness of steamed samples and samples not post-treated with steam exhibited moderate retention of color when washed. The Example utilized the GS ink set.

Example 25

The formulation employed in Example 24 was used to treat an 85/15 nylon/LYCRA® blend fabric. Results for this fabric were similar to those obtained in Example 24. The Example utilized the GS ink set.

Example 26

10.1 wet parts cationic copolymer CP 7091 RV (ECC International) (49.3% in water)(5 dry parts, or approximately 45% of the total dry parts) was added to 48.8 parts water with mixing. 11.5 wet parts PRINTRITE® 595 acrylic emulsion (Noveon Performance Coatings, 43.5% in water)(5 dry parts, or approximately 45% of the total dry parts), and 21.3 wet parts VARISOFT® 222 fabric softener (4.7% in water)(1 dry part, or approximately 9% of the total dry parts) were added, and the entire solution was mixed until homogeneous. This formulation was used to treat 100% cotton poplin via a padding application and dried. The sample was printed and evaluated using the process described in Example 1. The printed sample exhibited superior image quality with little or no bleed, excellent ink retention, and excellent color density. Samples that were not steamed exhibited good retention of color when washed. Samples that were steamed exhibited excellent enhancement for color and appearance. Permanence of color to washing was dramatically increased compared to untreated samples. The Example utilized the GS ink set.

Example 27

The formulation employed in Example 26 was used to treat an 85/15 nylon/LYCRA® blend fabric. The printed sample exhibited superior image quality with little or no bleed, excellent ink retention, and excellent color density. Permanence of color to washing was not improved in these samples. The Example utilized the GS ink set.

Example 28

10.1 wet parts cationic copolymer CP 7091 RV (ECC International) (49.3% in water)(5 dry parts, or approximately 45% of the total dry parts) was added to 51.2 parts water with mixing. 9.1 wet parts AIRFLEX® 540 latex emulsion (ethylene-vinyl acetate copolymer, 55.2% in water)(5 dry parts, or approximately 45% of the total dry parts), and 21.3 wet parts VARISOFT® 222 fabric softener (4.7% in water)(1 dry part, or approximately 9% of the total dry parts) were added and the entire solution was mixed until homogeneous. This formulation was used to treat 100% cotton poplin via a padding application and dried. The sample was printed and evaluated using the process described in Example 1. The printed sample exhibited superior image quality with little or no bleed, excellent ink retention, and excellent color density. Samples that were not steamed exhibited good retention of color when washed. Samples that were steamed exhibited excellent enhancement for color and appearance. Permanence of color to washing was dramatically increased compared to untreated samples. The Example utilized the GS ink set.

Example 29

The formulation employed in Example 28 was used to treat an 85/15 nylon/LYCRA® blend fabric. The printed sample exhibited superior image quality with little or no bleed, excellent ink retention, and excellent color density. Permanence of color to washing was not improved in these samples. The Example utilized the GS ink set.

Example 30

50.7 wet parts cationic copolymer CP 7091 RV (ECC International) (49.3% in water)(25 dry parts, or approximately 18–19% of the total dry parts) was added to 881.9 parts water with mixing. 181.3 wet parts AIRFLEX® 540 latex emulsion (ethylene-vinyl acetate copolymer, 55.2% in water)(100 dry parts, or approximately 74% of the total dry parts), and 11.1 wet parts VARISOFT® 222 fabric softener (90% in water)(10 dry parts, or approximately 7% of the total dry parts) were added and the entire solution was mixed until homogeneous. This formulation was used to treat a 250 denier polyester/cotton banner fabric via a padding application and dried. The sample was printed as described in Example 1. The printed samples exhibited superior image quality with little or no bleed, excellent ink retention, and excellent color density. Permanence of color to washing was dramatically increased without steaming or other steps.

Example 31

50.7 wet parts cationic copolymer CP 7091 RV (ECC International) (49.3% in water) (25 dry parts, or approximately 18–19% of the total dry parts) was added to 878.0 parts water with mixing. 181.3 wet parts AIRFLEX® 540 latex emulsion (ethylene-vinyl acetate copolymer, 55.2% in water)(100 dry parts, or approximately 74% of the total dry parts), and 15.0 wet parts ADOGEN® 432 fabric softener (66.7% in water)(10 dry parts, or approximately 7% of the total dry parts) were added and the entire solution was mixed until homogeneous. This formulation was used to treat a 250 denier polyester/cotton banner fabric via a padding application and dried. The sample was printed as described in Example 1. The printed samples exhibited superior image quality with little or no bleed, excellent ink retention, and excellent color density. Permanence of color to washing was dramatically increased without steaming or other steps.

Textile samples in Examples 30 through 35 were printed with the ENCAD® GO ink set obtained from the ENCAD® Inc.

Example 32

The formulation employed in Example 31 was used to treat a polyester poplin fabric. The printed sample exhibited superior image quality with little or no bleed, excellent ink retention, and excellent color density. Permanence of color to washing was dramatically increased without steaming or other curing steps.

Example 33

The formulation employed in Example 31 was used to treat a polyester satin fabric. The printed sample exhibited superior image quality with little or no bleed, excellent ink retention, and excellent color density. Permanence of color to washing was dramatically increased without steaming or other curing steps. In addition, the sample possessed excellent visual color reflectivity. Such quality may be observed visually or measured through diffuse reflectance methods.

Example 34

The formulation employed in Example 31 was used to treat a polyester poplin fabric. The printed sample exhibited superior image quality with little or no bleed, excellent ink retention, and excellent color density. Permanence of color to washing was dramatically increased without steaming or other steps.

Example 35

The formulation employed in Example 31 was used to treat a polyester satin fabric. The printed sample exhibited superior image quality with little or no bleed, excellent ink retention, and excellent color density. Permanence of color to washing was dramatically increased without steaming or other steps. In addition, sample possessed excellent color reflectivity.

Example 36

50.7 wet parts cationic copolymer CP 7091 RV (ECC International) (49.3% in water)(25 dry parts, or approximately 17% of the total dry parts) was added to 993.5 parts water with mixing. 230.9 wet parts PRINTRITE® 591 acrylic emulsion (Noveon Performance Coatings, 43.3% in water)(100 dry parts, or approximately 68–69% of the total dry parts), and 296.3 wet parts VARISOFT® 475 fabric softener (6.8% in water) (20 dry parts, or approximately 13–14% of the total dry parts) were added and the entire solution was mixed until homogeneous. This formulation was used to treat 100% silk charmeuse via a padding application and dried. Wet pick-up was 140%. The sample was printed and evaluated using the process described in Example 1. The printed sample exhibited superior image quality with little or no bleed, excellent ink retention, and excellent color density. Samples that were not steamed exhibited good retention of color when washed. Samples that were steamed exhibited excellent enhancement for color and appearance. Permanence of color to washing was dramatically increased compared to untreated samples. The Example utilized the GS ink set.

Results of Trials 30–36

The printed images on the textile samples from Examples 29–35 were waterfast and exhibited acceptable lightfastness for outdoor stability in accordance with ASTM test method G26 when printed with ENCAD® GO inks. ASTM test method G26 included the following steps:

The standard practice under ASTM G26 for operating a light-exposure (xenon-arc type) with and without water for exposure of nonmetallic materials consists of the following procedures. Test method 1 was employed for continuous exposure to light and intermittent exposure to water spray. The type of apparatus used consisted of an Atlas Ci 5000 apparatus. The instrument was programmed for continuous light and intermittent water spray in accordance with the manufacturer's instructions. The conventional cycle of 102 minutes of light exposure followed by a cycle of 18 minutes of light and water spray was employed. Such sample data measurements are reflected in the following Table 6. The method of print mode is double strike, at 102 light, 18 min. spray after 6 hours.

TABLE 6

| FR POLY. POPLIN | L* | A* | B* | DELTA E |
|---|---|---|---|---|
| Black 1 | 29.0 | 1.7 | −3.3 | 1.5 |
| Cyan | 60.6 | −22.1 | −38.5 | 4.2 |
| Yellow | 89.7 | −9.0 | 64.4 | 14.5 |
| Magenta | 52.3 | 49.1 | −10.0 | 2.6 |

From the experimental data it was determined that desirable coatings by fabric type are as follows: Cotton poplin and Jersey knit desirably use the coating described in Example 21 at about 13% total solids; Silk Crepe de Chine and Charmeuse use the coating described in Example 36 at about 7% total solids; Polyester Georgette uses the coating described in Example 30 at about 32% total solids; Poly Satin and Poly DACRON® use the previous coating (Example 30) at about 32% total solids; and Poly Poplin uses the same coating at between about 20–25% total solids.

If textile post treatment is desired (i.e. a heating step, such as steaming, oven heating, ironing, or other form of curative step) a still further alternate embodiment of the present invention relates to treatments/coating formulations and related methods for treating textile substrates which enhance the color brilliance, adhesion, and/or waterfastness/detergentfastness of inkjet reactive dye, acid dye, and pigment based inks on textile fabric substrates, which utilizes an imbibing solution in conjunction with a substrate coating. For the purposes of this application, an imbibing solution shall mean a solution used to saturate a fabric such that it penetrates the interstitial spaces of the fabric. The coating solution (or treatment, as has earlier been described) itself may include the imbibing solution, or in the alternative, the coating solution and imbibing solution may be applied in separate application steps.

The treatment or coating formulations in the present invention consist primarily of cationic polymers, binders, fabric softeners, and other additives similar to those previously described. However, in conjunction with these coating formulations, an imbibing solution is used to further treat the fabric substrate. For example, in a first embodiment utilizing the imbibing solution with reactive ink sets, an imbibing solution consisting of either sodium bicarbonate or sodium carbonate and urea, (for added color brilliance with post-treatment) is used with an aqueous coated fabric treatment. The imbibing solution is desirably applied at a level of between about 5–20% by weight, more desirably 5–10% by weight, depending on fabric type, and by using a standard saturation/padding method. When the imbibing solution is made a part of the aqueous coating composition, desirably, the sodium bicarbonate, sodium carbonate, or combination is present in the imbibing/coating solution in an amount between about 3 and 10 percent of the total solids. Desirably, the urea is present in the combined imbibing/coating solution in an amount between about 5 and 12 percent of the total solids. Other additives may be included in the combined coating/imbibing solution such as wetting agents, and defoamers. If additives are present in the formulation, they are desirably present in an amount between about 0.1 and 1 percent of the total solids. For instance, the wetting agent Q2-5211 may be included in the combined coating/imbibing solution. Optionally, dye fixatives may also be included in the coating formulation at less than about 5% of the total solids.

When the imbibing solution is applied as a separate solution following the coating formulation application, the sodium bicarbonate/sodium carbonate is also desirably present in an amount between about 30 and 40 percent of the total solids. The urea is present in the separate imbibing solution in an amount between about 50 and 70 percent solids. When the imbibing solution is used as a separate solution from the coating formulation, it may also include a wetting agent in solution as well as other additives in the same amounts as the prior embodiment. Water is present in solution in an amount between about 10 and 90 percent of the solution. As has been stated, this imbibing solution embodiment is desirably used with the reactive colorant classes, including those which may be applied via ink jet printing processes such as the monochlorotriazines and/or vinyl sulfones.

In a second embodiment utilizing an imbibing solution, the aqueous imbibing solution includes ammonium sulfate and urea for added color brilliance with post-treatment. As has been stated for the previous embodiment, the imbibing solution may be a part of the initial coating, or a separate solution. In this embodiment, the ammonium sulfate is desirably present in an amount between about 5 and 10 percent of the total solids, when used as part of the coating formulation. The urea is desirably present in the combined coating/imbibing solution in an amount of between about 2 and 5 percent of the total solids. When the imbibing solution is a separate solution from the coating solution, the ammonium sulfate is present in ah amount of between about 30 and 40 percent of the total solids. The urea is present in this separate imbibing solution in an amount between about 50 and 70 percent of the total solids. Other additives may be included in the combined coating/imbibing solution such as wetting agents, surfactants and defoamers. For instance, the wetting agent Q2-5211 may be included in the combined coating/imbibing solution. Optionally, dye fixatives may also be included in the coating formulation at less than about 5 percent of the total solids. To reiterate, when the imbibing solution is used as a separate solution from the coating formulation, the solution also includes water and optionally wetting agents. The second embodiment is to be used with the acid dye class including those which may be applied via ink jet printing processes. The imbibing solution is desirably applied at a level of 5–20% by weight, depending on fabric type, and by using a standard saturation/padding method. More desirably, the imbibing solution is applied at a level of 10–15% by weight. It should be noted that when the imbibing solution for the above described embodiments are to be made separately from the coating formulation, they can either be mixed in a 50/50 ratio with the coating formulation to be applied simultaneously or in the alternative, the coating formulation can first be applied to the fabric, the fabric dried, and then the imbibing solution can be applied to the fabric and then dried.

Textile substrates for use with the treatment methods may include cotton, silk, linen, polyester, rayon, nylon, and blends thereof. Conventionally, reactive dyes are used for cotton substrates and acid dyes are used for silk and nylon substrates. However, because of the coating treatment and fixation treatment (imbibing solution) associated with it, the invention allows for the fixation of classes of dyes on substrates that they are not normally associated with, or which would not be done commercially because the fixation is not normally facile or efficient. As demonstrated by the set of examples which follow, the disclosed ink jet receptive substrates that have been further treated with an imbibing solution provide high color density and saturation, superior print quality, reduction of wicking or bleeding, and enhanced ink absorption. Furthermore, the coating or treatment formulations provide a color enhanced waterfast/detergentfast printed image when printed with an ink jet printing process with post-printing treatment steps, such as heating, steaming, chemical fixation, or radiation curing. With a conventional steaming process, minimal dye washout occurs, thus minimal dyewaste occurs.

This alternate embodiment of the present invention is further described by the set of examples which follow. Such examples, however, are not meant to be construed as limiting in any way either the spirit or the scope of the present invention.

EXAMPLE CONDITIONS

A series of coatings were created including cationic polymers, fabric softeners, latex binders, other additives and water. The coatings are identified below with the respective content percentages. It should be noted that certain coatings included an imbibing solution within their formulation while others did not, and an imbibing solution was therefore utilized in a separate application step. Batch sizes are expressed in grams.

First Coating (Similar to that Used in the Previous Example 21), Referred to as Types A, B & D in the Examples which Follow, for Use with Cotton Fabrics

| ORDER OF ADDITION INGREDIENTS | % TOTAL SOLIDS | DRY PARTS | WET PARTS | BATCH SIZE (GRAMS) |
|---|---|---|---|---|
| CP7091RV | 49.30 | 18.50 | 37.53 | 18.01 |
| AIRFLEX ® 540 | 55.17 | 37.00 | 67.07 | 32.19 |
| PRINTRITE ® 591 | 43.50 | 37.00 | 85.06 | 40.83 |
| VARISOFT ® 475 | 10.00 | 7.40 | 74.00 | 35.52 |
| Water | | | 569.69 | 273.45 |
| | 12 | 100 | 833.33 | 400 |

Separate Imbibing Solution Referred to as Type C for Use with Cotton Fabrics

| ORDER OF ADDITION INGREDIENTS | % TOTAL SOLIDS | DRY PARTS | WET PARTS | BATCH SIZE |
|---|---|---|---|---|
| Sodium Bicarbonate | 63.40 | 3.00 | 4.73 | 22.70 |
| Urea | 95.00 | 5.00 | 5.26 | 30.81 |
| Q2-5211 | 100.00 | 0.20 | 0.20 | 1.17 |
| Water | | | 58.34 | 341.49 |
| | 12 | 8.2 | 68.33 | Approx. 400 |

The DYESET® concentrations (Polyamines), designated as DYESET® Conc. in the tables that follow, were obtained from Sybron Chemicals of Wellford, S.C., along with DYESET® NOZ and DYESET® NFS. Such materials are dye fixatives for reactive dyes. The Q2-5211 which is a wetting agent, was obtained from Dow Corning. The sodium bicarbonate can be obtained from VWR of Norcross, Ga. and Baker Chemical, and the Urea can be obtained from Baker Chemical.

The "Combo", which is a Combination of a Coating and Imbibing Solution, Referred to in the Examples Which Follow as Type E, for Use with Cotton Fabrics.

| ORDER OF ADDITION INGREDIENTS | % TOTAL SOLIDS | DRY PARTS | WET PARTS | BATCH SIZE |
|---|---|---|---|---|
| CP709IRV | 49.30 | 16.50 | 33.47 | 16.06 |
| AIRFLEX ® 540 | 55.17 | 35.00 | 63.44 | 30.45 |
| PRINTRITE ® 591 | 43.50 | 35.00 | 80.46 | 38.62 |
| VARISOFT ® 475 | 10.00 | 5.40 | 54.00 | 25.92 |
| Sodium Bicarb | 63.40 | 3.00 | 4.73 | 2.27 |
| Urea | 95.00 | 5.00 | 5.26 | 2.53 |
| Q2-5211 | 100.00 | 0.20 | 0.20 | 0.10 |
| Water | | | 591.97 | 284.15 |
| | 12 | 100 | 833.33 | 400 |

Coating (Similar to that of Previous Example 21), Referred to in the Following Examples as Type F, Used for Cotton Fabrics

| ORDER OF ADDITION INGREDIENTS | % TOTAL SOLIDS | DRY PARTS | WET PARTS | BATCH SIZE |
|---|---|---|---|---|
| CP709IRV | 49.30 | 17.50 | 35.50 | 17.04 |
| AIRFLEX ® 540 | 55.17 | 36.00 | 65.25 | 31.32 |
| PRINTRITE ® 591 | 43.50 | 36.00 | 82.76 | 39.72 |
| VARISOFT ® 475 | 10.00 | 7.40 | 74.00 | 35.52 |
| DYESET ® NOZ | 12.20 | 3.00 | 24.59 | 11.80 |
| Q2-5211 | 100.00 | 0.20 | 0.20 | 0.10 |
| Water | | | 551.23 | 264.59 |
| | 12 | 100 | 833.33 | 400 |

Coating, Referred to in the Examples that Follow as Type G, Used for Cotton

| ORDER OF ADDITION INGREDIENTS | % TOTAL SOLIDS | DRY PARTS | WET PARTS | BATCH SIZE |
|---|---|---|---|---|
| CP709IRV | 49.30 | 17.50 | 35.50 | 17.04 |
| AIRFLEX ® 540 | 55.17 | 36.00 | 65.25 | 31.32 |
| PRINTRITE ® 591 | 43.50 | 36.00 | 82.76 | 39.72 |
| VARISOFT ® 475 | 10.00 | 7.40 | 74.00 | 35.52 |
| DYESET ® NFS | 36.70 | 3.00 | 8.17 | 3.92 |
| Q2-5211 | 100.00 | 0.20 | 0.20 | 0.10 |
| Water | | | 567.65 | 272.47 |
| | 12 | 100 | 833.33 | 400 |

Coating, Referred to in the Following Examples as Type H for Cotton Fabrics.

| ORDER OF ADDITION INGREDIENTS | % TOTAL SOLIDS | DRY PARTS | WET PARTS | BATCH SIZE |
|---|---|---|---|---|
| CP709IRV | 49.30 | 17.50 | 35.50 | 17.04 |
| AIRFLEX ® 540 | 55.17 | 36.00 | 65.25 | 31.32 |
| PRINTRITE ® 591 | 43.50 | 36.00 | 82.76 | 39.72 |
| VARISOFT ® 475 | 10.00 | 7.40 | 74.00 | 35.52 |
| DYESET ® Conc. | 47.60 | 3.00 | 6.30 | 3.03 |
| Q2-5211 | 100.00 | 0.20 | 0.20 | 0.10 |
| Water | | | 569.52 | 273.37 |
| | 12 | 100 | 833.33 | 400 |

Coating, Referred to in the Following Examples as Type I for Cotton Fabrics

| ORDER OF ADDITION INGREDIENTS | % TOTAL SOLIDS | DRY PARTS | WET PARTS | BATCH SIZE |
|---|---|---|---|---|
| CP7091RV | 49.30 | 15.50 | 31.44 | 15.09 |
| AIRFLEX ® 540 | 55.17 | 34.00 | 61.63 | 29.58 |
| PRINTRITE ® 591 | 43.50 | 34.00 | 78.16 | 37.52 |
| VARISOFT ® 475 | 10.00 | 5.40 | 54.00 | 25.92 |
| DYESET ® Conc | 47.60 | 3.00 | 6.30 | 3.03 |
| Sodium Bicarb | 63.40 | 3.00 | 4.73 | 2.27 |
| Urea | 95.00 | 5.00 | 5.26 | 2.53 |
| Q2-5211 | 100.00 | 0.20 | 0.20 | 0.10 |
| Water | | | 591.81 | 284.07 |
| | 12 | 100 | 833.33 | 400 |

Coating, Referred to in the Examples that Follow as Type J for Cotton Fabrics.

| ORDER OF ADDITION INGREDIENTS | % TOTAL SOLIDS | DRY PARTS | WET PARTS | BATCH SIZE |
|---|---|---|---|---|
| CP7091RV | 49.30 | 15.50 | 31.44 | 15.09 |
| AIRFLEX ® 540 | 55.17 | 34.00 | 61.63 | 29.58 |
| PRINTRITE ® 591 | 43.50 | 34.00 | 78.16 | 37.52 |
| VARISOFT ® 475 | 10.00 | 5.40 | 54.00 | 25.92 |
| DYESET ® NOZ | 12.20 | 3.00 | 24.59 | 11.80 |
| Sodium Bicarb | 63.40 | 3.00 | 4.73 | 2.27 |

-continued

| ORDER OF ADDITION INGREDIENTS | % TOTAL SOLIDS | DRY PARTS | WET PARTS | BATCH SIZE |
|---|---|---|---|---|
| Urea | 95.00 | 5.00 | 5.26 | 2.53 |
| Q2-5211 | 100.00 | 0.20 | 0.20 | 0.10 |
| Water | | | 573.52 | 275.29 |
| | 12 | 100 | 833.33 | 400 |

Coating Referred to in the Following Examples as Type K for Cotton Fabrics.

| ORDER OF ADDITION INGREDIENTS | % TOTAL SOLIDS | DRY PARTS | WET PARTS | BATCH SIZE |
|---|---|---|---|---|
| CP7091RV | 49.30 | 15.50 | 31.44 | 15.09 |
| AIRFLEX ® 540 | 55.17 | 34.00 | 61.63 | 29.58 |
| PRINTRITE ® 591 | 43.50 | 34.00 | 78.16 | 37.52 |
| VARISOFT ® 475 | 10.00 | 5.40 | 54.00 | 25.92 |
| DYESET ® NFS | 36.70 | 3.00 | 8.17 | 3.92 |
| Sodium Bicarb | 63.40 | 3.00 | 4.73 | 2.27 |
| Urea | 95.00 | 5.00 | 5.26 | 2.53 |
| Q2-5211 | 100.00 | 0.20 | 0.20 | 0.10 |
| Water | | | 589.94 | 283.17 |
| | 12 | 100 | 833.33 | 400 |

It should be noted that the above coatings can be used on a variety of textiles including silk and nylon. Additionally, the following coating can be used for nylon/LYCRA® and silk substrates when using acid dyes.

Coating, Used for Nylon/Lycra® and Silk Fabrics with Acid Dyes Sets

| ORDER OF ADDITION OF INGREDIENTS | % TOTAL SOLIDS | DRY PARTS | WET PARTS | BATCH SIZE |
|---|---|---|---|---|
| 5 RETEN ® 204LS | 17.95 | 25.00 | 139.28 | 452.62 |
| 2 AIRFLEX ® 540 | 55.27 | 100.00 | 181.26 | 589.06 |
| 3 VS475 | 10.00 | 20.00 | 200.00 | 649.97 |
| 4 Q2-5211 | 100.00 | 2.70 | 2.70 | 8.77 |
| | 1.00 | 0.00 | 0.00 | 0.00 |
| | 1.00 | 0.00 | 0.00 | 0.00 |
| 1 water | | | 707.60 | 2299.58 |
| | 12 | 147.7 | 1230.83 | 4000 |

The coating and imbibing solution may be poured together as described below. The separate acid dye fixation formula (imbibing solution, without coating solution) includes deionized water in the range of about 30–90%, but more desirably at about 83 weight percentage, ammonium sulfate in the range of about 2 to 40 total solids percent, urea in the range of about 1 to 40 solids percent, and an optional surfactant in the range of about 0.1–1.0, such as, SURFYNOL® 465 at about 0.2 weight percent. The acid dye fixation formula described above (acid imbibing solution) is used with a particular coating, such as coatings described to be similar to preliminary Example 21 (described in the reactive dye section) or the coating listed immediately above, by being poured into the coating in a 50/50 ratio and then applied to the substrate as previously described, as opposed to being applied in a separate application step. For the silk substrate in particular, the coating used was combined in a 50/50 ratio with the acid imbibing solution.

Alternatively, the coating and imbibing solution can be combined, such as in the formulation described below.

Coating, Used for Nylon/Lycra® and Silk Fabric Substrates, with Acid Dyes Sets, Including Both Preliminary Coating and Imbibing Solution

| ORDER OF ADDITION OF INGREDIENTS NOTED BY NUMBER | % TOTAL SOLIDS | DRY PARTS | WET PARTS | BATCH SIZE |
|---|---|---|---|---|
| 7 CP7091RV | 49.3 | 15.5 | 31.4 | 19.51 |
| 4 AIRFLEX ® 540 | 55.17 | 34 | 61.6 | 38.25 |
| 6 PRINTRITE ® 591 | 43.5 | 34 | 78.2 | 48.51 |
| 5 VARISOFT ® 475 | 10 | 20.4 | 204.0 | 126.62 |
| 3 Ammonium Sulfate | 100 | 7 | 7.0 | 4.34 |
| 2 Urea | 95 | 5 | 5.3 | 3.27 |
| 1 Water | | | 584.4 | 362.75 |
| | 12.00 | 116 | 966.67 | 600 |

REACTIVE DYE EXAMPLES

Example 1

In this and the following examples, 11 by 15 inch fabric samples were evaluated. In example 1, the samples were first coated and then imbibed. In particular, the fabric was first coated through a dip and nip procedure/padding as has been previously described, using coating A and then dried in a forced air oven at 100° C. for 30 seconds. Following this step the fabric sample was imbibed in a dip and nip/padding method using imbibing solution C and dried again in the oven at 100° C. for 30 seconds. For each example (except where otherwise noted) tour fabric sample sheets were tested. In order to achieve good hand attributes, the goal for percent dry pickup was between 7 and 9. The percent dry pickup was calculated in accordance with the following series of equations. These equations are described in *Wellington Sears Handbook of Industrial Textiles*, by Sabit Adanur, PH.D. copyright 1995, p. 179.

$$\text{Wet pickup (\%)} = \frac{\text{Weight of formulation picked up}}{\text{Weight of dry fabric}} \times 100$$

Add-on (%)=Concentration of Formulation (%)×Wet Pickup (%)

From this the following equation was utilized to arrive at the values in the charts for % dry-pickup.

% Dry Pickup=((Wet/Basis Weight)×100)−100×% Solids (TS)

Results of Example 1

OBJECTIVE: TO IMBIBE COTTON POPLIN FABRIC USING TYPE A COATING AND SEPARATE IMBIBING SOLUTION. T.S.* OF 11.6 IN PERCENT

| # | BW Dry in grms/m$^2$ | Wet weight in grams | % Pickup Dry |
|---|---|---|---|
| 1 | 14.1 | 24.29 | 8.4 |
| 2 | 14.1 | 24.21 | 8.4 |
| 3 | 14.3 | 24.74 | 8.5 |
| 4 | 14.3 | 25.28 | 9.0 |

*T.S. represents total solids (percent), BW represents basis weight.

Example 2

In this example fabric samples were imbibed first using imbibing solution Type C and then coated with Coating Type B using the procedures described in previous Example 1.

OBJECTIVE: TO IMBIBE COTTON POPLIN USING TYPE B WITH T.S. 11.6/T.S. 10.6

| | Imbibing Step T.S. 11.6 | | | Coating Step T.S. 10.6 | | |
|---|---|---|---|---|---|---|
| SAMPLE # | BW in grms/m$^2$ | Wet weight in grms | % Dry Pickup | BW in grms/m$^2$ | Wet weight in grms | % Dry Pickup |
| 1 | 10.85 | 22.71 | 12.6 | 12.42 | 22.20 | 8.4 |
| 2 | 10.87 | 22.88 | 12.7 | 12.38 | 21.35 | 7.7 |
| 3 | 10.8 | 22.16 | 12.2 | 12.34 | 22.22 | 8.5 |
| 4 | 10.9 | 22.46 | 12.3 | 11.74 | 20.94 | 8.3 |

Example 3

In this example fabric samples were imbibed only with solution Type C.

OBJECTIVE: TO IMBIBE COTTON POPLIN WITH SOLUTION TYPE C WITH T.S. OF 12

| Sample # | BW in grms/m$^2$ | Wet weight in grms | % Dry Pickup |
|---|---|---|---|
| 1 | 10.83 | 21.92 | 11.8 |
| 2 | 10.58 | 21.63 | 12.1 |
| 3 | 9.69 | 19.75 | 12.1 |
| 4 | 9.7 | 20.6 | 12.9 |

Example 4

In this example fabric samples were coated only with Type D coating.

OBJECTIVE: TO COAT FABRIC SAMPLES ONLY WITH TYPE D/T.S. 10.6.

| Sample # | BW in grms/m$^2$ | Wet weight in grms | % Dry Pickup |
|---|---|---|---|
| 1 | 9.73 | 18.46 | 9.5 |
| 2 | 9.84 | 18.54 | 9.3 |
| 3 | 10.73 | 20.79 | 9.9 |
| 4 | 10.76 | 20.93 | 10.1 |

Example 5

In this example fabric samples were coated with the Combo Type E solution.

OBJECTIVE: TO TREAT FABRICS WITH THE COMBO SOLUTION/T.S. 11.4, TYPE E

| Sample # | BW in grms/m$^2$ | Wet weight in grms | % Dry Pickup |
|---|---|---|---|
| 1 | 10.97 | 21.14 | 10.6 |
| 2 | 10.74 | 20.47 | 10.3 |
| 3 | 10.75 | 20.62 | 10.5 |

Example 6

In this example fabric samples were coated with Type F coating

| OBJECTIVE: TYPE F COATING; DYESET ® NOZ AND T.S. 11.1 | | | |
|---|---|---|---|
| Sample # | BW in grms/$m^2$ | Wet weight in grms | % Dry Pickup |
| 1 | 10.84 | 21.7 | 11.1 |
| 2 | 11.02 | 21.29 | 10.3 |
| 3 | 10.87 | 21.26 | 10.7 |

Example 7

In this example fabric samples were treated with Type G coating.

| OBJECTIVE: TYPE G/-DYESET ® NFS AND T.S. 11.68 | | | |
|---|---|---|---|
| Sample # | BW in grms/$m^2$ | Wet weight in grms | % Dry Pickup |
| 1 | 10.84 | 21.1 | 11.1 |
| 2 | 10.85 | 20.7 | 10.6 |
| 3 | 10.77 | 20.7 | 10.8 |

Example 8

In this example fabric samples were treated with Type H coating.

| OBJECTIVE: TYPE H/-DYESET ® CONC T.S. 11.2 | | | |
|---|---|---|---|
| Sample # | BW in grms/$m^2$ | Wet weight in grms | % Dry Pickup |
| 1 | 10.86 | 21.1 | 10.5 |
| 2 | 10.86 | 21.3 | 10.6 |
| 3 | 10.86 | 20.6 | 10.4 |

Example 9

In this example fabric samples were treated with Type I coating.

| OBJECTIVE: TYPE I/CONC T.S. 11.4 | | | |
|---|---|---|---|
| Sample # | BW in grms/$m^2$ | Wet weight in grms | % Dry Pickup |
| 1 | 10.6 | 20.9 | 11.1 |
| 2 | 10.9 | 21.4 | 10.9 |
| 3 | 10.8 | 21.2 | 10.9 |

Example 10

In this example fabric samples were treated with Type J coating.

| OBJECTIVE: TYPE J/NOZ/T.S. 11 | | | |
|---|---|---|---|
| Sample # | BW in grms/$m^2$ | Wet weight in grms | % Dry Pickup |
| 1 | 10.98 | 21.4 | 10.5 |
| 2 | 10.78 | 21.2 | 10.6 |
| 3 | 10.72 | 20.73 | 10.2 |

Example 11

In this example fabric samples were treated with Type K coating.

| OBJECTIVE: TYPE K/NFS | | | |
|---|---|---|---|
| Sample # | BW in grms/$m^2$ | Wet weight in grms | % Dry Pickup |
| 1 | 12.2 | 24.1 | 11.7 |
| 2 | 12.2 | 23.8 | 11.4 |
| 3 | 10.7 | 20.8 | 11.3 |

Reactive Dye Example Results

Each of the samples were exposed on half of their area to D65/ 10° illuminant (standard day light) to determine whether any yellowing occurs. A sample of each was also printed using the TX-1500 printer of ENCAD® and a reactive ink set available from Kimberly-Clark Printing Technology, Inc. of Escondido, Calif. under the designations 17960–17970. Prior to printing, the fabric sample was first laminated to a backing as has been previously described in the first example set. Examples of reactive dyes used included reactive blue 49 and black 5 available from companies such as DyStar and BASF Corporation. The reactive dye sets utilize vinyl sulfones and monochlorotriazines.

Since reactive dyes are typically not ink-jetted because of the level of particulates and other salt components in the dyes, a reactive dye set was developed for testing with the coatings. It is surmised that other reactive dye sets could also be used in conjunction with the coatings, such as those dyes available from Ciba. The dyed samples were dried overnight in the dark.

Type A was demonstrated to work well only after it had been steamed. Exposing Type A to a water wash was acceptable before steaming but detergent wash demonstrated considerable washout. Type B was demonstrated to work well without steaming but had some redepositing problems onto the fabric. Type C was demonstrated as having the most washout of all samples tested without steaming and having a visually impaired appearance. After steaming the results for Type C were very much improved. Type D demonstrated positive results across all samples but failed the water spot test and printed samples. Only after washing and/or after steam and washing did Type D sample pass water spot testing. Type E demonstrated very acceptable results with water spotting occurring on printed sample only. Type E demonstrated poor results in detergent washing with no post processing steps. Type F demonstrated positive visual appearances as did Type H samples. Type G samples failed most testing. Types I, J and K each demonstrated relatively the same positive results, although type K was shown to be a better performer in terms of appearance and washability.

For the purposes of this application the water spot test comprised AATTC Test Method 104-1994. Essentially in this test, a drop of water is placed on a substrate and then rubbed down using a glass rod. The substrate is then observed to see if a water spot remains after the water dries. If a white circle appears then a water spot is considered to have been left.

Other reactive dye ink sets may be used with these coatings including those available from Kimberly-Clark Printing Technology, Inc. under the designations, TXCR-500 Black, TXCR-520 Red, TXCR-523 Medium Red, TXCR-526 Scarlet, TXCR-530 Orange, TXCR-540 Yellow, TXCR-545 Golden Yellow, TXCR-550 Green, TXCR-560 Turquoise, TXCR-565 Medium Turquoise, TXCR-570

Blue, and TXCR-580 Gray. These reactive dye ink sets were tested with the above coatings by printing them through a COLORSPAN® DM XII 12-color printer/600 dpi.

Alternatively, instead of using reactive dye sets, acid dye ink sets may be used with acid dye fixation solutions (Imbibing solutions). Textile substrates which can use the acid dye sets include ones such as those with fibers that are dyeable with acid dyes, blended yarns, as long as the ratio is at least 15% between nylon and other material such as Lycra, and polyamides. Such acid dye sets are available from Kimberly-Clark Printing Technology, Inc. under the designation 17972–17975. Additional acid dye sets are available from Kimberly-Clark Printing Technology, Inc. under the designations 7287-20-2 Black, 7287-27-2 Gray, 6869-184-5 Violet, 7287-21-1 Blue, 7287-24-2 Lt. Blue, 7287-10-1 Turquoise, and 7287-25-1 Green, 6869-186-3B Magenta, 7287-24-1 Lt. Magenta, 6869-184-10 Scarlet, 7287-15-1 Orange, 7287-6-1 Yellow. Such inks were tested with the above described coatings using the COLORSPAN® DM XII printer previously described.

By using such dye sets, an inkjet solution to a conventional screen printing process using acid dyes and a treated substrate is provided. Providing a digital alternative to this market will greatly reduce the cost for the manufacturing of textiles and will allow for more custom-made products to be produced.

Acid Dye Examples

A coated and imbibed nylon fabric was prepared in a similar fashion to the fabric samples previously described, and printed with a test print on the dried sample. The sample was washed in hot water with no apparent dye washout.

In a second set of examples, acid dye sets were used on silk charmeuse and on nylon/LYCRA® fabric samples. As in the prior examples, fabric sheet swatches of 11 by inches were cut of the fabric, and the fabric was then tested in accordance with various test coatings. It should be noted that these fabrics can not be printed on directly while uncoated. The results for just washing demonstrates a Delta E of 40 for nylon/LYCRA® and a Delta E of 35 for the silk charmeuse without post treatment. However, following post treatment for coated fabrics the Delta E values for both were about 1.5 or less. Post treatment consisted of steaming, and in particular, steaming the fabrics at between about 105° C. to 125° C., approximately 25 minutes for silk and 45 minutes for nylon/LYCRA®. The following Table 7.

TABLE 7

| ACID INKS ON SILK, USING KIMBERLY-CLARK PRINTING TECH. INKS (COLOR) | STEAMED DELTA E | STEAMED AND WASHED DELTA E |
|---|---|---|
| Yellow | 8.9 | 0.5 |
| Orange | 7.1 | 0.5 |
| Scarlet | 17.2 | 1.5 |
| Med. Scarlet | 8.3 | 2.4 |
| Magenta | 19.2 | 1.5 |
| Green | 6.2 | 1.3 |
| Med. Trq. | 4.1 | 1.5 |
| Trq. | 4.9 | 0.7 |
| Blue | 5.3 | 1.9 |
| Violet | 6.6 | 0.8 |
| Grey | 3.4 | 1.2 |
| Black | 4.5 | 0.4 |

In a further alternative embodiment, it has been determined that a coating/imbibing formulation including ammonium salts of multifunctional weak acids, selected from the group consisting of ammonium oxalate from Aldrich and ammonium tartrate. Such coating/imbibing formulations desirably include ammonium oxalate as a particularly effective coating component for treating nylon/LYCRA® fabric substrates, present in the same amount as in the previous ammonium sulfate examples. However, use of such ingredient in the formulation tends to create "cross-hatching" in the printed image. In order to eliminate this cross-hatching for nylon/LYCRA® substrates, it has been determined that the addition of tanning agents eliminates this problem. Such tanning agents are exemplified by ethylene glycol monoethyl ether, and thiodiethylene glycol as described in the following coating formulations. Such tanning agents are available from Aldrich of Milwaukee, Wis. If used, it is desirable that such tanning agents be present in the coating formulation in an amount of between about 0.5 and 10% of total solids.

Ammonium Oxalate Coating, Used for Nylon/Lycra® and Silk Fabric Substrates, with Acid Dyes Sets, Including Both Preliminary Coating and Imbibing Solution

| ORDER OF ADDITION INGREDIENTS | % TOTAL SOLIDS | DRY PARTS | WET PARTS | BATCH SIZE |
|---|---|---|---|---|
| 7 CP7091RV | 49.3 | 15.5 | 31.4 | 19.51 |
| 5 AIRFLEX ® 540 | 55.17 | 34 | 61.6 | 38.25 |
| 6 PRINTRITE ® 591 | 43.5 | 34 | 78.2 | 48.51 |
| 4 VARISOFT ® 475 | 10 | 20.4 | 204.0 | 126.62 |
| 2 Ammonium Oxalate | 100 | 7 | 7.0 | 4.34 |
| 3 Urea | 95 | 5 | 5.3 | 3.27 |
| 1 Water | | | 584.4 | 362.75 |
| | 12.00 | 116 | 966.67 | 600 |

Expanded Ammonium Oxalate Coating, Used for Nylon/Lycra® and Silk Fabric Substrates, with Acid Dyes Sets, Including Both Preliminary Coating and Imbibing Solution

| ORDER OF ADDITION INGREDIENTS | % TOTAL SOLIDS | DRY PARTS | WET PARTS | BATCH SIZE |
|---|---|---|---|---|
| Water | | | 377.4 | 231.83 |
| Ammonium Oxalate | 100 | 7 | 7.0 | 4.30 |
| Urea | 95 | 5 | 5.3 | 3.23 |
| Thiodiethylene Glycol | 100 | 3 | 3.0 | 1.84 |
| Ethylene Glycol monoethyl ether | 100 | 2 | 2.0 | 1.23 |
| VARISOFT ® 475 | 10 | 17 | 170.0 | 104.43 |
| AIRFLEX ® 540 | 55.17 | 29 | 52.6 | 32.29 |
| PRINTRITE ® 591 | 43.5 | 29 | 66.7 | 40.95 |
| CP7091RV | 49.3 | 13 | 26.4 | 16.20 |
| | 15.00 | 105 | 700.00 | 430 |

Desirably, the ammonium oxalate is present in the coating/imbibing formulation in an amount similar to that of ammonium sulfate (as described in the previous examples). In running a Crockfastness test, that is Test Method 8 of the AATCC, described in the AATCC manual, *Color Technology in the Textile Industry*, 2$^{nd}$ Edition, Published 1997 by AATCC (American Association of Textile Chemists & Colorists), it was determined that such cross-hatching is eliminated by the use of ammonium oxalate in combination with tanning agents. This test demonstrated pass results for the rubbing of a substrate with a known cloth to look for ink rub off. This done is performed both wet and dry.

Pigment Ink Examples

It should also be recognized that pigmented ink formulations may also be used in conjunction with the coating and imbibing solution formulations. It is particularly desirable to use pigmented ink formulations available from Kimberly-Clark Printing Technology, Inc. under the designations 17976–17979. Examples of the pigment dispersions include ACRYJET® cyan, majenta, yellow and black available from the Rhom and Haas Corporation.

The coating/treatment formulations and methods which are the subject of this invention, provide ink jet printable textile substrates which possess characteristics of print and image quality, a noticeable color enhancement, color quality and density, ink retention capacity, and waterfastness and detergentfastness properties. Such formulations can be used to prepare articles of manufacture as previously described.

While the invention has been described in detail with particular reference to a preferred embodiment thereof, it should be understood that many modifications, additions, and deletions can be made thereto without departure from the spirit and the scope of the invention as set forth in the following claims.

What is claimed is:

1. An aqueous coating formulation containing solids, for enhancing image visualization and retention of acid dye-based inks, comprising:

a) a cationic homopolymer or copolymer, b) a fabric softener, c) urea, and d) ammonium oxalate.

2. The aqueous coating formulation of claim 1 wherein said cationic homopolymer or copolymer is present in an amount between 5 and 95 weight percent of the total solids.

3. The aqueous coating formulation of claim 1 wherein said fabric softener is present in an amount between 5 and 20 weight percent of the total solids.

4. The aqueous coating formulation of claim 1 further comprising a latex binder.

5. The aqueous coating formulation of claim 4 wherein said latex binder is present in an amount between 0 and 80 weight percent of the total solids.

6. The aqueous coating formulation of claim 1 wherein the urea is present in an amount between 2 and 5 weight percent of the total solids.

7. The aqueous coating formulation of claim 1 wherein the ammonium oxalate is present in an amount between 5 and 10 weight percent of the total solids.

8. The aqueous coating formulation of claim 1 further including additives selected from the group including wetting agents, defoamers, and surfactants.

9. The aqueous coating formulation of claim 1 further including at least one tanning agent.

10. The aqueous coating formulation of claim 9 wherein said tanning agent is either ethylene glycol monoethyl ether, thiodiethylene glycol, or a combination thereof.

11. The aqueous coating formulation of claim 9, wherein said tanning agent is present in an amount of between 0.5 and 10 weight percent of total solids.

12. An aqueous coating formulation containing solids, for enhancing image visualization and retention of inks, comprising:

a) a cationic homopolymer or copolymer, b) a fabric softener, c) urea, and d) ammonium oxalate.

13. The aqueous coating formulation of claim 12 further comprising a tanning agent, said tanning agent being either ethylene glycol monoethyl ether, thiodiethylene glycol, or a combination thereof.

14. An aqueous coating formulation containing solids, for enhancing image visualization and retention of inks, comprising:

a) a cationic homopolymer or copolymer, b) a fabric softener, c) urea, and d) ammonium salts of multifunctional weak acids, selected from the group consisting of ammonium oxalate and ammonium tartrate.

15. The aqueous coating formulation of claim 14 further comprising a tanning agent.

16. The aqueous coating formulation of claim 15, said tanning agent being either ethylene glycol monoethyl ether, thiodiethylene glycol, or a combination thereof.

* * * * *